United States Patent
Noh et al.

(10) Patent No.: US 10,123,338 B2
(45) Date of Patent: Nov. 6, 2018

(54) METHOD AND APPARATUS FOR ALLOCATING RESOURCES IN WIRELESS ACCESS SYSTEM SUPPORTING FDR TRANSMISSION

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/119,804

(22) PCT Filed: Mar. 26, 2015

(86) PCT No.: PCT/KR2015/002980
§ 371 (c)(1),
(2) Date: Aug. 18, 2016

(87) PCT Pub. No.: WO2015/147572
PCT Pub. Date: Oct. 1, 2015

(65) Prior Publication Data
US 2017/0064721 A1    Mar. 2, 2017

Related U.S. Application Data

(60) Provisional application No. 61/970,877, filed on Mar. 26, 2014, provisional application No. 61/987,439, filed on May 1, 2014.

(51) Int. Cl.
*H04W 72/08* (2009.01)
*H04L 5/14* (2006.01)
(Continued)

(52) U.S. Cl.
CPC ............. *H04W 72/082* (2013.01); *H04L 5/14* (2013.01); *H04L 43/16* (2013.01); *H04W 4/08* (2013.01); *H04W 72/048* (2013.01)

(58) Field of Classification Search
None
See application file for complete search history.

(56) References Cited

U.S. PATENT DOCUMENTS

| | | |
|---|---|---|
| 2006/0008078 A1 | 1/2006 | El-Fishaway |
| 2009/0092066 A1 | 4/2009 | Chindapol et al. |

(Continued)

FOREIGN PATENT DOCUMENTS

| | | |
|---|---|---|
| WO | 2009091208 | 7/2009 |
| WO | 2009154408 | 12/2009 |

(Continued)

OTHER PUBLICATIONS

U.S. Appl. No. 15/121,755, Office Action dated Sep. 19, 2017, 14 pages.

(Continued)

*Primary Examiner* — Kouroush Mohebbi
(74) *Attorney, Agent, or Firm* — Lee Hong Degerman Kang Waimey

(57) ABSTRACT

The present invention relates to a wireless access system supporting a full duplex radio (FDR) transmission environment. A method for a base station for allocating resources in a wireless access system supporting FDR according to an embodiment of the present invention comprises the steps of: receiving, from a terminal, information regarding whether or not the terminal is participating in a grouping in which a plurality of terminals are configured as a group for resource allocation; and determining whether or not to group and allocating resources on the basis of the information regarding whether or not participating, wherein the information (Continued)

regarding whether or not participating may comprise a first item of information indicating whether the terminal can operate in full duplex (FD) in the same resource, a second item of information indicating (FD) in the same resource, a second item of information indicating FD operation is not possible in the same resource but whether an FD operation of another apparatus is supported, and a third item of information indicating whether a participation in the grouping is requested.

14 Claims, 18 Drawing Sheets

(51) Int. Cl.
*H04W 72/04* (2009.01)
*H04L 12/26* (2006.01)
*H04W 4/08* (2009.01)

(56) References Cited

U.S. PATENT DOCUMENTS

| | | |
|---|---|---|
| 2009/0186621 A1 | 7/2009 | Umeda et al. |
| 2009/0213765 A1 | 8/2009 | Rinne et al. |
| 2009/0268645 A1 | 10/2009 | Chindapol et al. |
| 2009/0325578 A1 | 12/2009 | Li et al. |
| 2010/0113059 A1 | 5/2010 | Morimoto et al. |
| 2010/0177717 A1 | 7/2010 | Sung et al. |
| 2010/0290375 A1 | 11/2010 | Chin et al. |
| 2010/0317339 A1 | 12/2010 | Koc |
| 2011/0045831 A1 | 2/2011 | Chiu et al. |
| 2013/0021954 A1 | 1/2013 | Montojo et al. |
| 2013/0128782 A1 | 5/2013 | Boixadera et al. |
| 2013/0150106 A1 | 6/2013 | Bucknell, et al. |
| 2014/0146738 A1 | 5/2014 | Morioka et al. |
| 2015/0049624 A1 | 2/2015 | Sun et al. |

FOREIGN PATENT DOCUMENTS

| | | | |
|---|---|---|---|
| WO | 2012077938 | 6/2012 | |
| WO | 2013048030 | 4/2013 | |
| WO | 2013134930 | 9/2013 | |
| WO | WO-2013134930 A1 * | 9/2013 | .......... H04W 72/082 |
| WO | 2013178084 | 12/2013 | |

OTHER PUBLICATIONS

European Patent Office Application Serial No. 15767890.5, Search Report dated Oct. 12, 2017, 8 pages.

Huawei, "Interference mitigation schemes for TDD eIMTA", 3GPP TSG RAN WG1 Meeting #72, R1-130015, KP050663497, Feb. 2013, 5 pages.

PCT International Application No. PCT/KR2015/002977, Written Opinion of the International Searching Authority dated Jun. 19, 2015, 19 pages.

PCT International Application No. PCT/KR2015/002980, Written Opinion of the International Searching Authority dated Jun. 19, 2015, 15 pages.

PCT International Application No. PCT/KR2015/002978, Written Opinion of the International Searching Authority dated Jul. 24, 2015, 16 pages.

PCT International Application No. PCT/KR2015/002979, Written Opinion of the International Searching Authority dated Jul. 24, 2015, 19 pages.

U.S. Appl. No. 15/121,755, Final Office Action dated Apr. 12, 2018, 14 pages.

U.S. Appl. No. 15/121,755, Office Action dated Sep. 10, 2018, 12 pages.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5
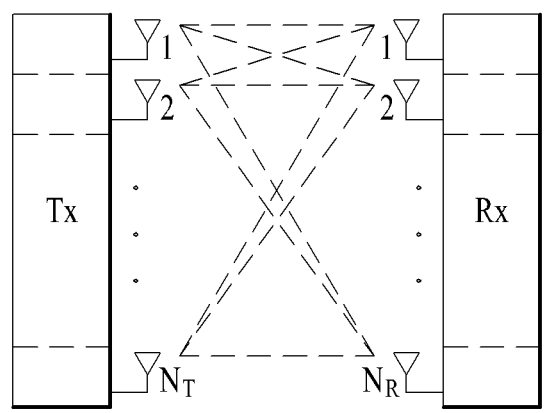
(a)
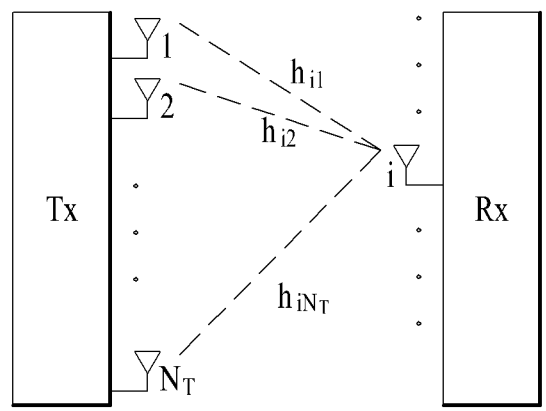
(b)

FIG. 7
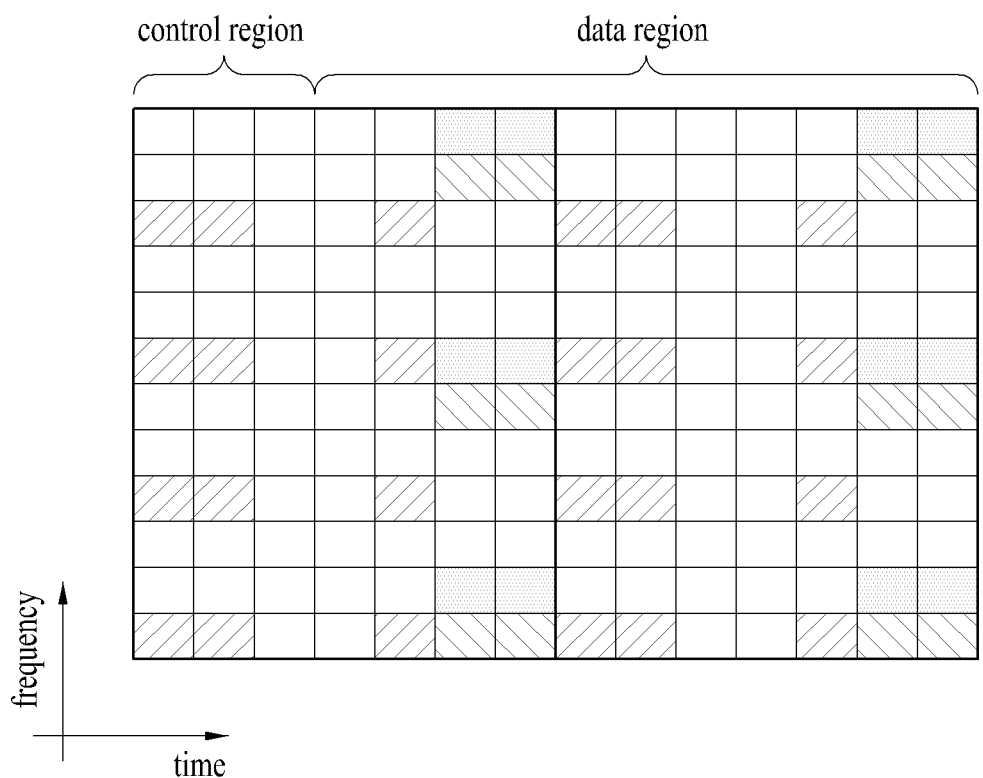
 CRS
 DM RS (CDM group 1)
 DM RS (CDM group 2)

FIG. 14

| 00x | FDR is not supported |
|---|---|
| 010 | FD mode operation X, FD mode support O, grouping participation request X |
| 011 | FD mode operation X, FD mode support O, grouping participation request O |
| 100 | FD mode operation O, FD mode support X, grouping participation request X |
| 101 | FD mode operation O, FD mode support X, grouping participation request O |
| 110 | FD mode operation O, FD mode support O, grouping participation request X |
| 111 | FD mode operation O, FD mode support O, grouping participation request O |

FIG. 15

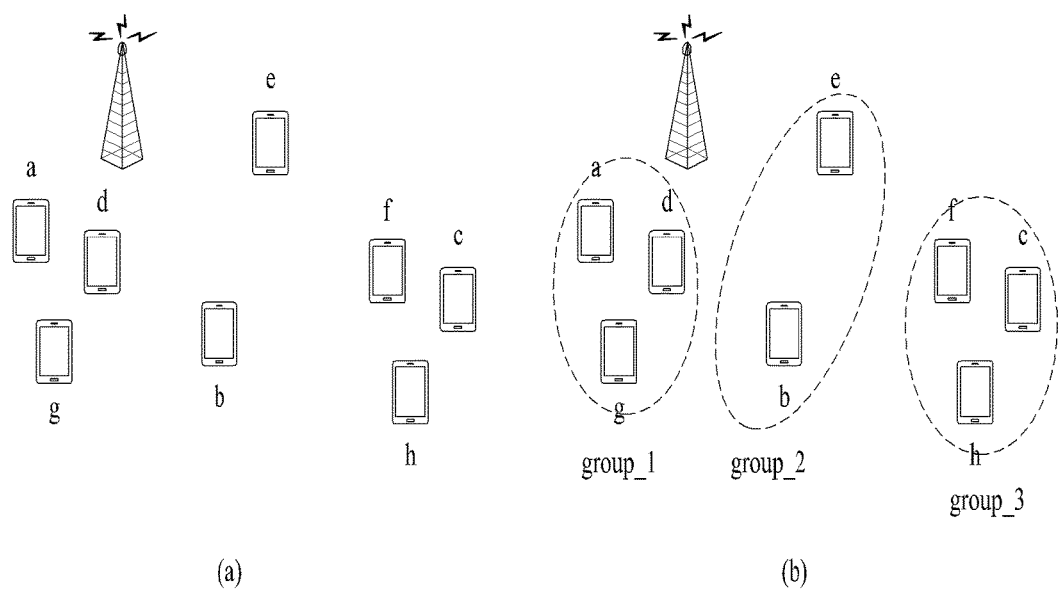

FIG. 16
|   | a | b | c | d | e | f | g | h |
|---|---|---|---|---|---|---|---|---|
| a | 0 | 3 | 7 | 1 | 4 | 5 | 2 | 6 |
| b | 7 | 0 | 6 | 2 | 1 | 3 | 4 | 5 |
| c | 7 | 4 | 0 | 5 | 3 | 1 | 6 | 2 |
| d | 2 | 3 | 7 | 0 | 4 | 5 | 1 | 6 |
| e | 7 | 1 | 4 | 3 | 0 | 2 | 6 | 5 |
| f | 7 | 4 | 1 | 5 | 3 | 0 | 6 | 2 |
| g | 2 | 3 | 7 | 1 | 4 | 6 | 0 | 5 |
| h | 7 | 3 | 1 | 6 | 4 | 2 | 5 | 0 |
 target UE
 measurement UE
FIG. 17
| a | b | c | d | e | f | g | h |
|---|---|---|---|---|---|---|---|
| 4.875 | 2.625 | 4.125 | 2.875 | 2.875 | 3 | 3.75 | 3.875 |
FIG. 18
|   | a | b | c | d | e | f | g | h |   |
|---|---|---|---|---|---|---|---|---|---|
| a | 0 | 3 | 7 | 1 | 4 | 5 | 2 | 6 | 2 |
| b | 7 | 0 | 6 | 2 | 1 | 3 | 4 | 5 | 3.8 |
| c | 7 | 4 | 0 | 5 | 3 | 1 | 6 | 2 | 3.25 |
| d | 2 | 3 | 7 | 0 | 4 | 5 | 1 | 6 | 2 |
| e | 7 | 1 | 4 | 3 | 0 | 2 | 6 | 5 | 3.8 |
| f | 7 | 4 | 1 | 5 | 3 | 0 | 6 | 2 | 3.25 |
| g | 2 | 3 | 7 | 1 | 4 | 6 | 0 | 5 | 2.75 |
| h | 7 | 3 | 1 | 6 | 4 | 2 | 5 | 0 | 3.25 |

FIG. 19

|   | b | c | e | f | h |     |
|---|---|---|---|---|---|-----|
| b | 0 | 6 | 1 | 3 | 5 | 1   |
| c | 4 | 0 | 3 | 1 | 2 | 2   |
| e | 1 | 4 | 0 | 2 | 5 | 1.5 |
| f | 4 | 1 | 3 | 0 | 2 | 2   |
| h | 3 | 1 | 4 | 2 | 0 | 2   |

FIG. 20

|   | a | b | c | d | e | f | g | h |
|---|---|---|---|---|---|---|---|---|
| a | 0 | 5 | 1 | 7 | 4 | 3 | 6 | 2 |
| b | 1 | 0 | 2 | 6 | 7 | 5 | 4 | 3 |
| c | 1 | 4 | 0 | 3 | 5 | 7 | 2 | 6 |
| d | 6 | 5 | 1 | 0 | 4 | 3 | 7 | 2 |
| e | 1 | 7 | 4 | 5 | 0 | 6 | 2 | 3 |
| f | 1 | 4 | 7 | 3 | 5 | 0 | 2 | 6 |
| g | 6 | 5 | 1 | 7 | 4 | 2 | 0 | 3 |
| h | 1 | 5 | 7 | 2 | 4 | 6 | 3 | 0 |

FIG. 21

|   | a | d | e | f | g | h |
|---|---|---|---|---|---|---|
| a | 0 | 7 | 4 | 3 | 6 | 2 |
| d | 6 | 0 | 4 | 3 | 7 | 2 |
| e | 1 | 5 | 0 | 6 | 2 | 3 |
| f | 1 | 3 | 5 | 0 | 2 | 6 |
| g | 6 | 7 | 4 | 2 | 0 | 3 |
| h | 1 | 2 | 4 | 6 | 3 | 0 |

|   | a | e | g | h |
|---|---|---|---|---|
| a | 0 | 4 | 6 | 2 |
| e | 1 | 0 | 2 | 3 |
| g | 6 | 4 | 0 | 3 |
| h | 1 | 4 | 3 | 0 |

(a)

|   | a | h |
|---|---|---|
| a | 0 | 2 |
| h | 1 | 0 |

(b)

FIG. 25
| grouping participation request | included in group | grouping candidate target identification |
|---|---|---|
| 0 | 0 | UE which has not participated in FD mode |
| 0 | 1 | UE which quits participation in FD mode within the same resource |
| 1 | 0 | new UE which will participate in grouping |
| 1 | 1 | UE which is already configured in group and maintains participation in FD mode |
FIG. 26
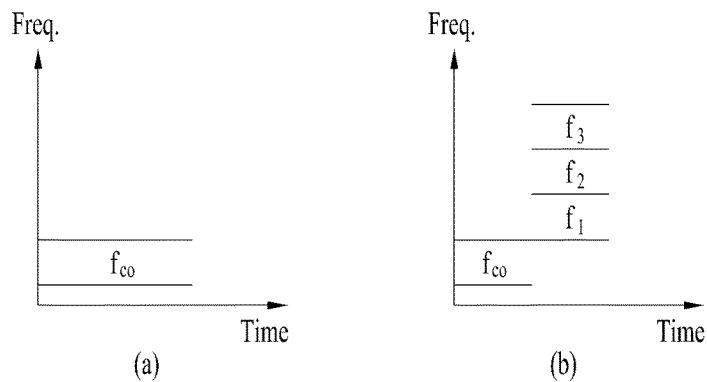
FIG. 27
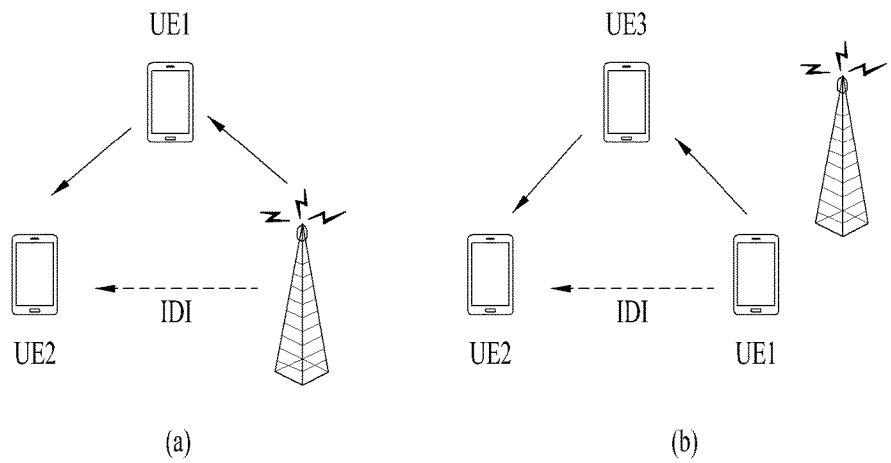

METHOD AND APPARATUS FOR ALLOCATING RESOURCES IN WIRELESS ACCESS SYSTEM SUPPORTING FDR TRANSMISSION

CROSS-REFERENCE TO RELATED APPLICATIONS

This application is the National Stage filing under 35 U.S.C. 371 of International Application No. PCT/KR2015/ 002980, filed on Mar. 26, 2015, which claims the benefit of U.S. Provisional Application No. 61/970,877, filed on Mar. 26, 2014 and 61/987,439, filed on May 1, 2014, the contents of which are all hereby incorporated by reference herein in their entirety.

TECHNICAL FIELD

The present invention relates to a wireless access system supporting a Full Duplex Radio (FDR) transmission environment and, more particularly, to a method for efficiently transmitting and receiving a signal when FDR is applied and an apparatus supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide methods for efficiently transmitting and receiving a signal in a wireless access system supporting FDR transmission.

Another object of the present invention is to provide an apparatus supporting the above methods.

The technical objects that can be achieved through the present invention are not limited to what has been particularly described hereinabove and other technical objects not described herein will be more clearly understood by persons skilled in the art from the following detailed description.

Technical Solution

To solve the problem, a method for allocating resources from an eNB in a wireless access system supporting full duplex radio (FDR) according to one embodiment of the present invention comprises the steps of receiving, from a UE, information as to whether the UE participates in grouping for resource allocation by configuring a plurality of UEs as a group; and determining whether the UE is configured to be included in the group, on the basis of the information as to whether the UE participates in grouping, and allocating resources, wherein the information as to whether the UE participates in grouping includes first information as to whether the UE may be operated in a full duplex (FD) mode at the same resource, second information indicating that FD operation is not possible at the same resource but whether an FD operation of another device is supported, and third information indicating whether a participation in the grouping is requested.

The method may further comprise the step of receiving group allocation information as to whether the UE has been previously included in the group.

If the third information indicates a request of participation in the grouping and the group allocation information indicates that the UE has been previously included in the group, the method may further comprise the step of measuring interference by allocating respective frequencies different from each other to each of a plurality of groups for a first time.

If the third information indicates a request of participation in the grouping and the group allocation information indicates that the UE has not been previously included in the group, the method may further comprise the step of measuring interference by allocating a common frequency to all of the plurality of UEs for a second time.

If the group allocation information indicates that the UE is included in the group and the third information indicates a non-request of participation in the grouping, the UE may be released from the group.

If the UE is included in a previously configured group and the third information indicates a request of participation in the grouping, the method may further comprise the step of determining movement of the UE between groups.

If the FD mode at the same resource and FD mode of another device are supported, the information as to whether the UE participates in grouping may further include information of a corresponding one of the two modes, in which the UE is operated.

An eNB for allocating resources in a wireless access system supporting full duplex radio (FDR) according to another embodiment of the present invention comprises radio frequency (RF) units; and a processor, wherein the processor is configured to receive, from a UE, information as to whether the UE participates in grouping for resource allocation by configuring a plurality of UEs as a group and determine whether the UE is configured to be included in the group, on the basis of the information as to whether the UE participates in grouping and allocate resources, and the information as to whether the UE participates in grouping includes first information as to whether the UE may be operated in a full duplex (FD) mode at the same resource, second information indicating that FD operation is not possible at the same resource but whether an FD operation of another device is supported, and third information indicating whether a participation in the grouping is requested.

The processor may be configured to receive group allocation information as to whether the UE has been previously included in the group.

If the third information indicates a request of participation in the grouping and the group allocation information indicates that the UE has been previously included in the group, the processor may be configured to measure interference by allocating respective frequencies different from each other to each of a plurality of groups for a first time.

If the third information indicates a request of participation in the grouping and the group allocation information indicates that the UE has not been previously included in the group, the processor may be configured to measure interference by allocating a common frequency to all of the plurality of UEs for a second time.

If the group allocation information indicates that the UE is included in the group and the third information indicates a non-request of participation in the grouping, the UE may be released from the group.

If the UE is included in a previously configured group and the third information indicates a request of participation in the grouping, the processor may be configured to determine movement of the UE between groups.

If the FD mode at the same resource and FD mode of another device are supported, the information as to whether the UE participates in grouping may further include information of a corresponding one of the two modes, in which the UE is operated.

BRIEF DESCRIPTION OF THE DRAWINGS

FIG. 5 is a schematic diagram illustrating a wireless communication system having multiple antennas.

FIG. 7 is a diagram illustrating an example of a DM RS pattern defined in an LTE-A system.

FIG. 14 illustrates an example of grouping participating bit allocation.

FIG. 15 illustrates an example of eNB and UE arrangement for cell-specific grouping and group configuration.

FIG. 16 illustrates that IDI values are aligned for each UE from highest to lowest on the basis of IDI measured by each UE.

FIG. 17 illustrates an average value of each row in FIG. 16.

FIG. 18 illustrates selection of UEs for configuring a first group.

FIG. 19 illustrates that target UEs are selected for the other UEs except UEs a, d and g of which group is determined.

FIG. 20 illustrates that IDI values are aligned from lowest to highest contrary to FIG. 16, and an example of configuration of a first group based on best relationship.

FIG. 21 illustrates that UEs b and c are configured as a group and then target UEs except the UEs b and c are selected to configure a second group like FIG. 20.

FIG. 25 illustrates an example of identifying grouping candidates by using a grouping participation request and whether grouping candidates are included in a group.

FIG. 26 illustrates an example of allocation of frequency for IDI measurement to grouping candidate UEs.

FIG. 27 illustrates an example that a UE performs an FD mode operation within the same resource.

BEST MODE FOR CARRYING OUT THE INVENTION

Figure 1:
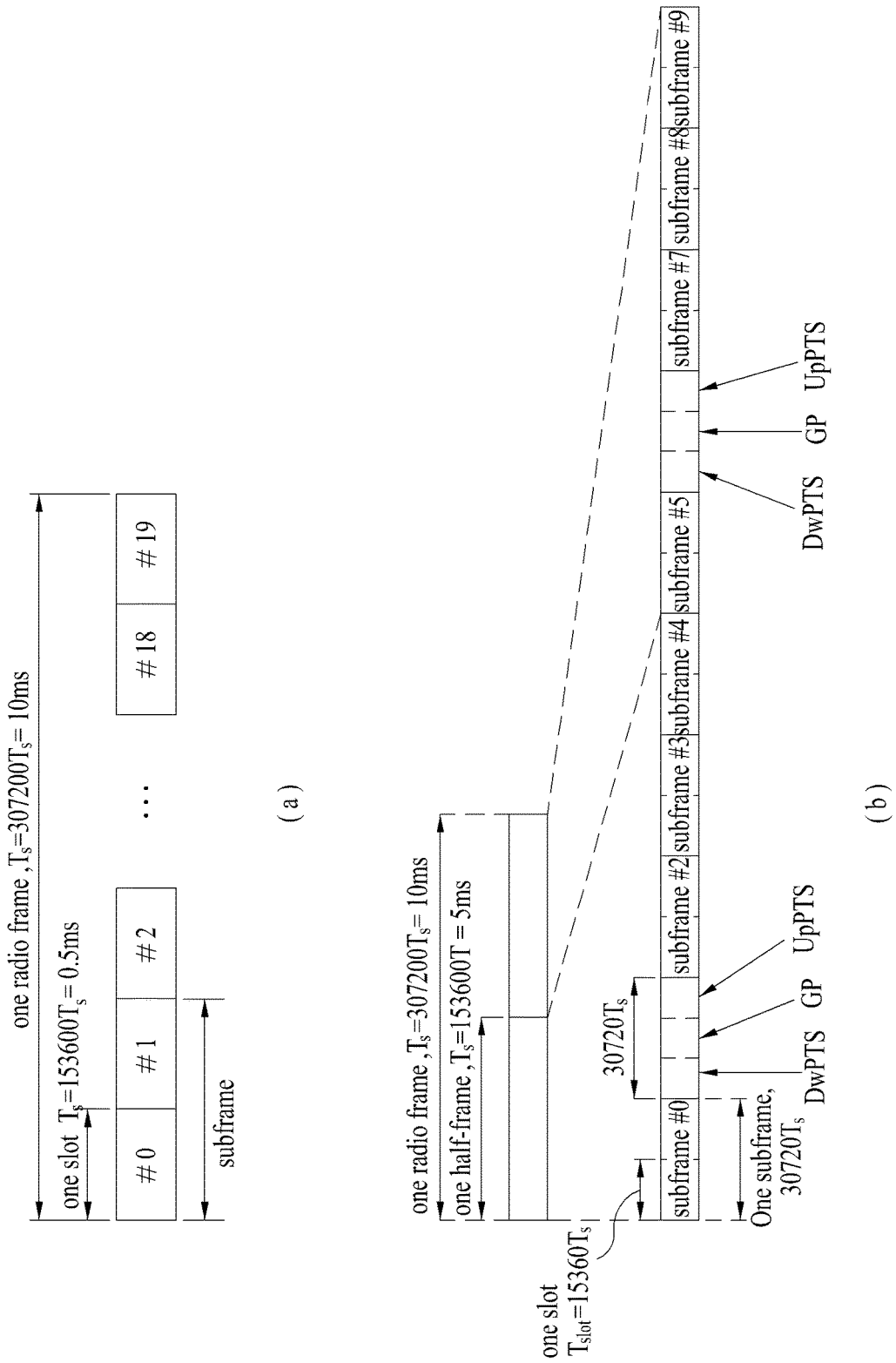
FIG. 1 illustrates a structure of a radio frame in a 3GPP LTE.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

FIG. 1 illustrates a structure of a radio frame in a 3GPP LTE.

FIG. 1 illustrates a frame structure type 2. The frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An ith subframe includes two slots corresponding to 2i and (2i+1), each of which has a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal. The DwPTS, the GP and the UpPTS are included in the special subframe of Table 1.

Figures 2, 3:
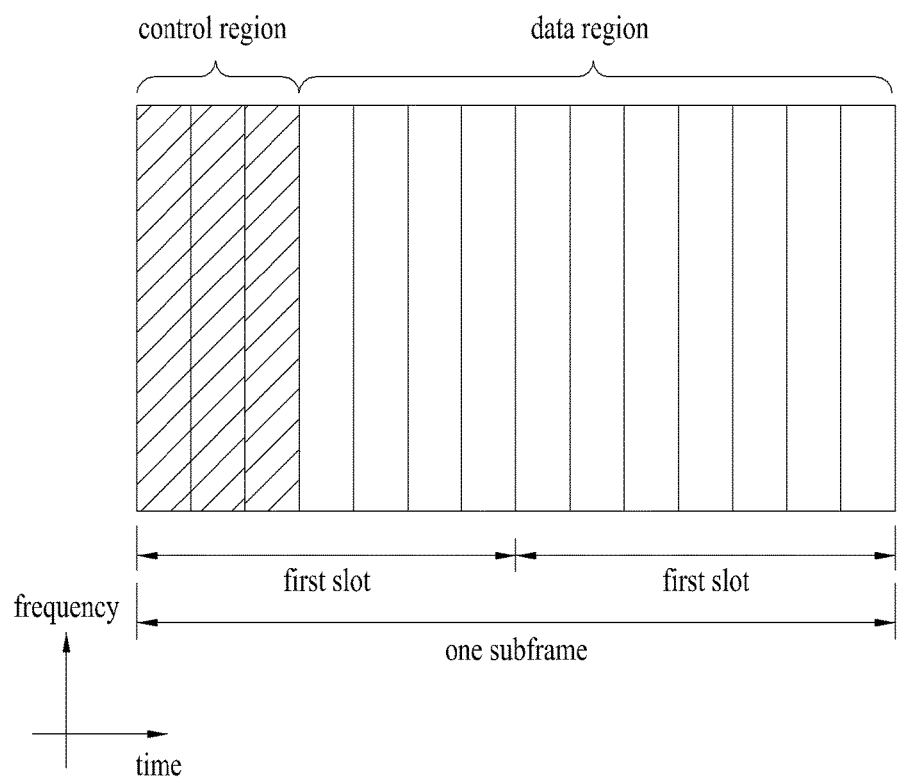
FIG. 2 illustrates an example of frame configuration in a radio frame structure of FIG. 1.
FIG. 3 is a diagram illustrating a structure of a downlink subframe.

FIG. 2 illustrates an example of frame configuration in a radio frame structure of FIG. 1.

In FIG. 2, D is a subframe for downlink transmission, U is a subframe for uplink transmission, and S is a special subframe for a guard time.

All UEs within each cell have one frame configuration of configurations in FIG. 2. That is, since frame configuration depends on a cell, frame configuration may be referred to as cell-specific configuration.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
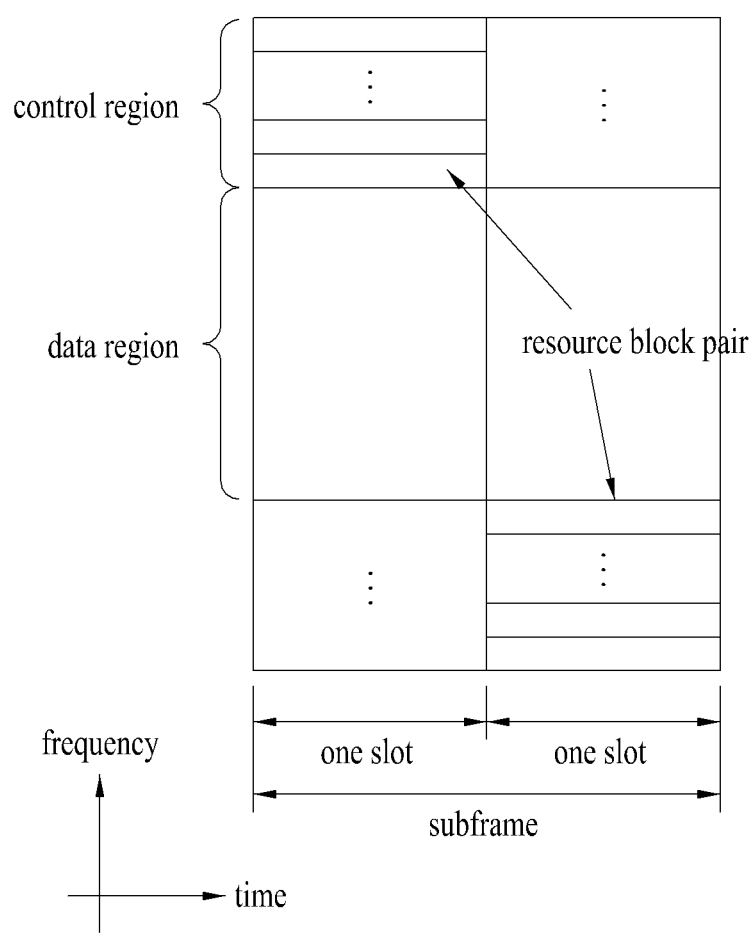
FIG. 4 is a diagram illustrating a structure of an uplink subframe.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

FIG. 5 illustrates the configuration of a wireless communication system supporting multiple antennas. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}] \qquad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as $$h_i^T = [h_{i1}, h_{i2}, \ldots h_{iN_T}]$$ [Equation 7]

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_R N_T} \end{bmatrix}$$ [Equation 8]

Actual channels experience the above channel matrix H and then are added with Additive White Gaussian Noise (AWGN). The AWGN added to the NR Rx antennas is given as the following vector.

$$n = [n_1, n_2, \ldots n_{N_R}]^T$$ [Equation 9]

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R)$$ [Equation 11]

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission.

To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
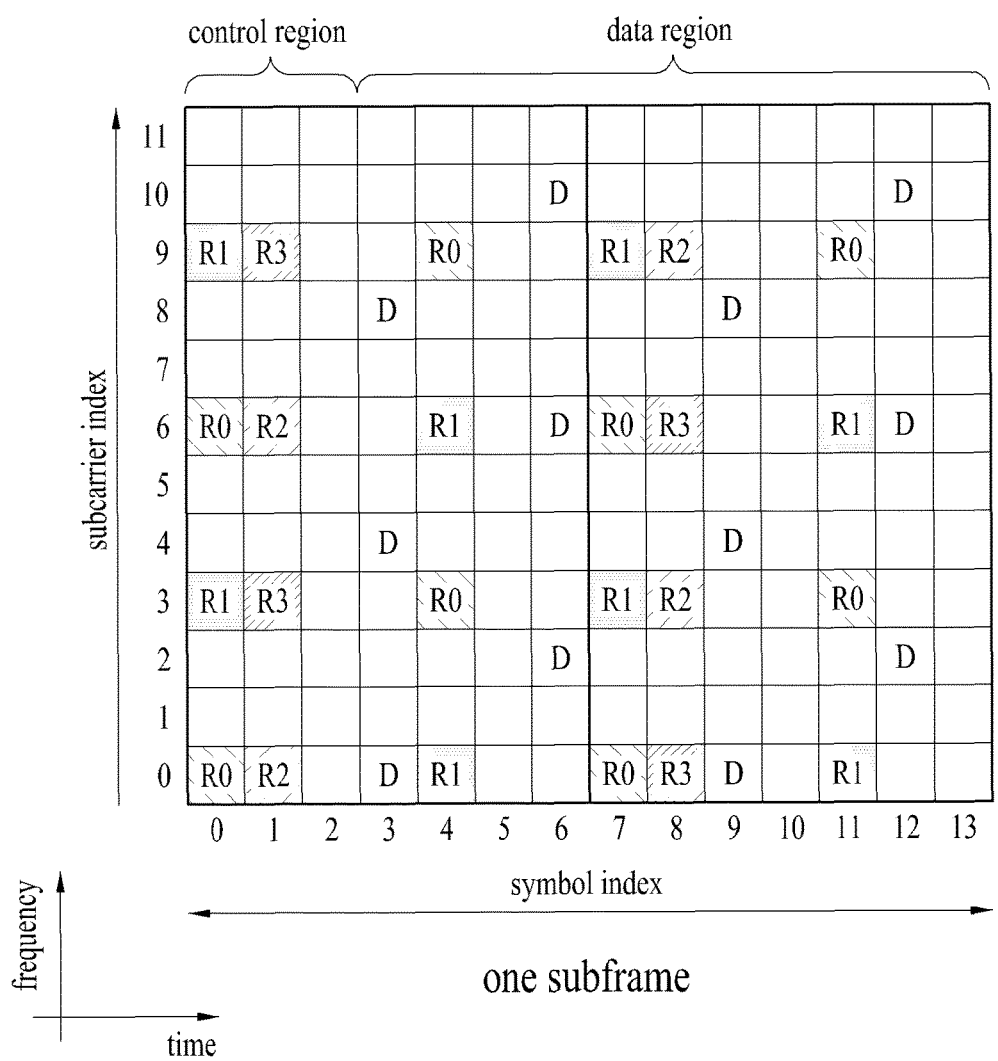
FIG. 6 is a diagram illustrating an example of CRS and DRS patterns on one resource block.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
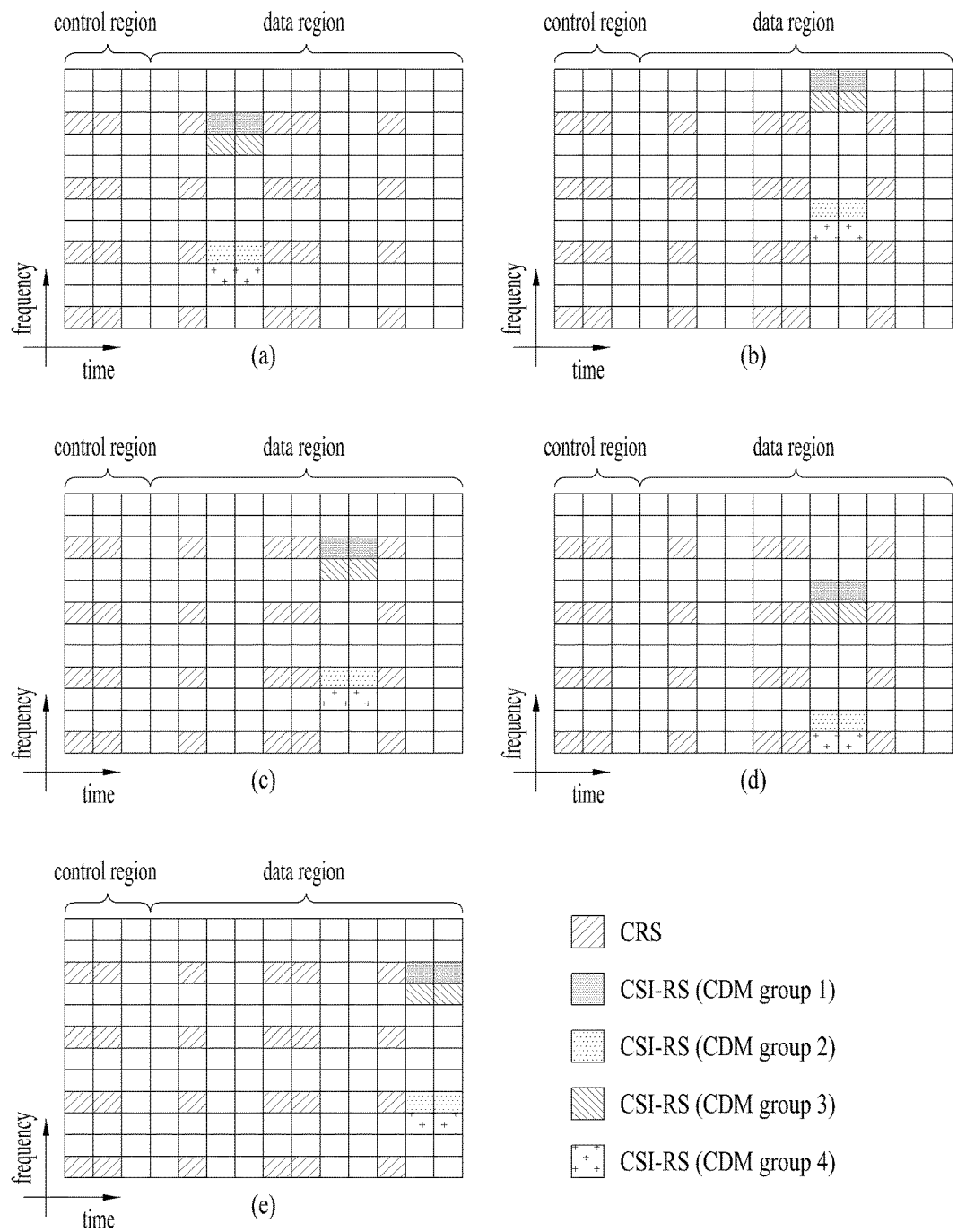
FIG. 8 is a diagram illustrating examples of a CSI-RS pattern defined in an LTE-A system.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
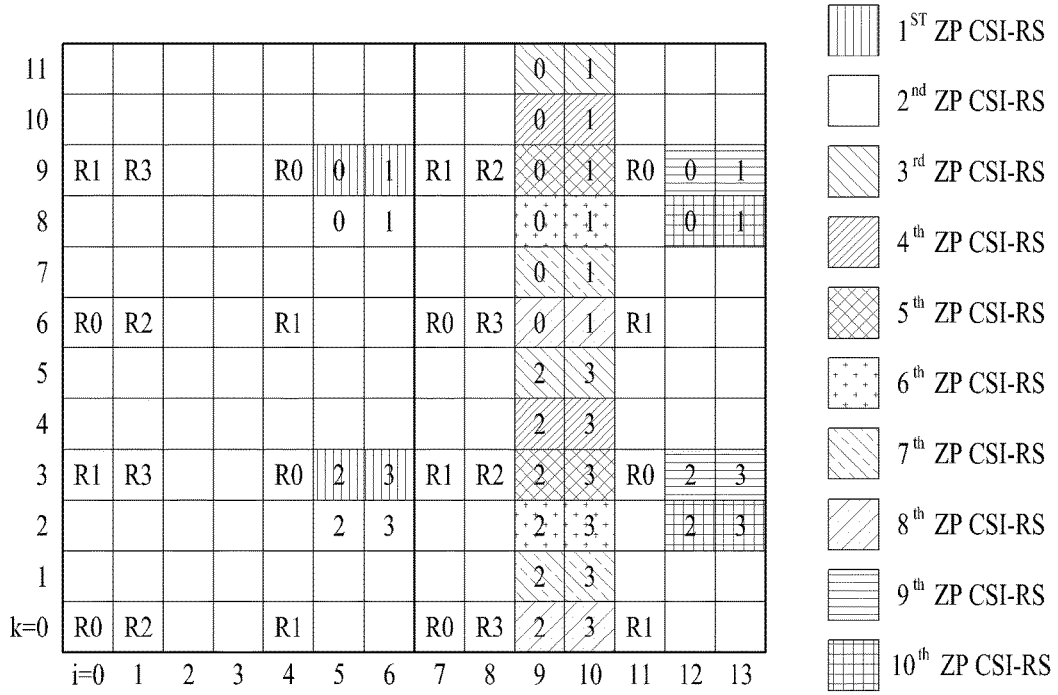
FIG. 9 is a diagram illustrating an example of a zero power (ZP) CSI-RS pattern defined in an LTE-A system.

FIG. 9 is a diagram illustrating an exemplary Zero-Power (ZP) CSI-RS pattern defined in an LTE-A system. A ZP CSI-RS is largely used for two purposes. First, the ZP CSI-RS is used to improve CSI-RS performance. That is, one network may mute a CSI-RS RE of another network in order to improve CSI-RS measurement performance of the other network and inform a UE thereof of the muted RE by setting the muted RE to a ZP CSI-RS so that the UE may correctly perform rate matching. Second, the ZP CSI-RS is used for interference measurement for CoMP CQI calculation. That is, some networks may mute a ZP CRS-RS RE and a UE may calculate a CoMP CQI by measuring interference from the ZP CSI-RS.

The RS patterns of FIGS. 6 to 9 are purely exemplary and an RS pattern applied to various embodiments of the present invention is not limited to such specific RS patterns. In other words, even when an RS pattern different from the RS patterns of FIGS. 6 to 9 is defined and used, various embodiments of the present invention may be identically applied.

Full Duplex Radio (FDR) Transmission

Full Duplex Radio (FDR) refers to a system that simultaneously supports data transmission and reception using the same resource in a transmission device. For example, an eNB or UE which supports FDR may perform transmission without duplexing by dividing uplink/downlink into frequency/time.

Figure 10:
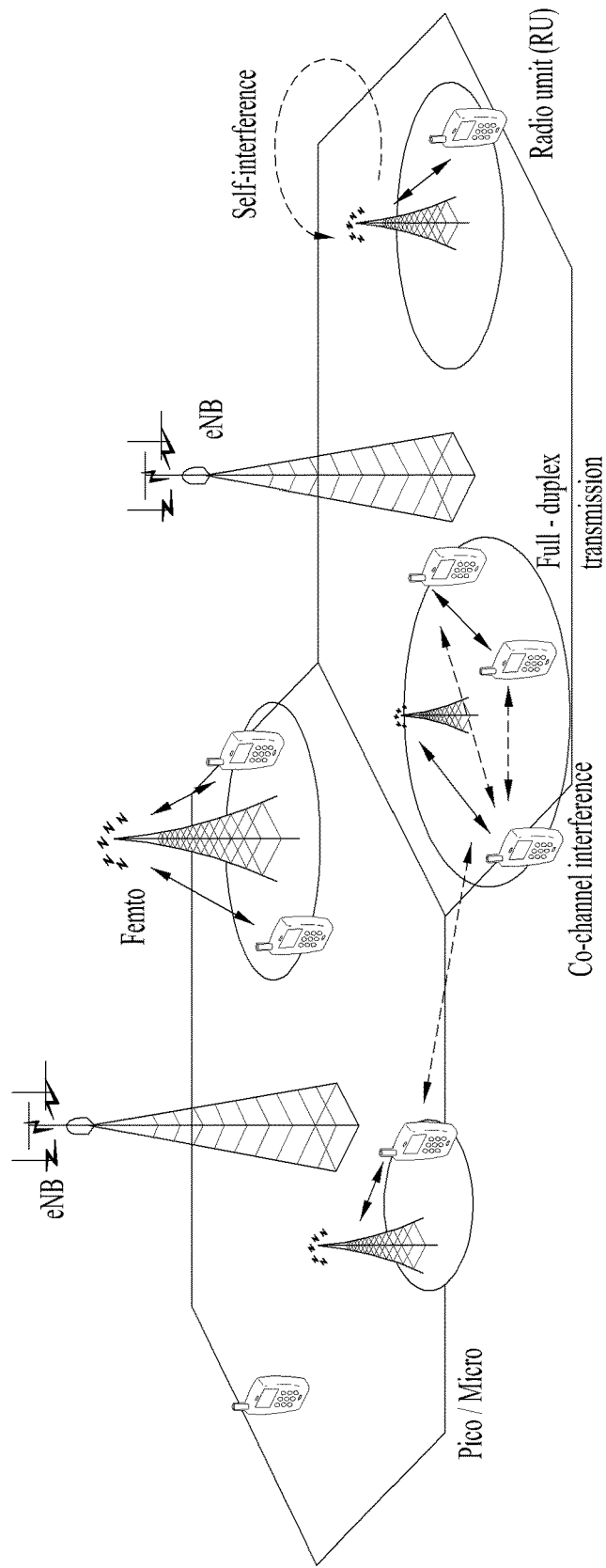
FIG. 10 is a diagram illustrating an example of a system supporting FDR.

FIG. 10 illustrates an example of a system that supports FDR.

Referring to FIG. 10, two types of interferences exist in an FDR system.

First of all, intra-device interference indicates that a signal transmitted from a transmission antenna in an FDR device is received by a reception antenna, thereby acting as interference. Generally, a self-interference signal is received more strongly than a desired signal desired to be received by the FDR device. Therefore, it is important to cancel interference perfectly through interference attenuation.

Secondly, inter-device interference (IDI) indicates that an uplink signal transmitted from an eNB or UE is received by a neighboring eNB or UE, thereby acting as interference.

In a legacy communication system, since half-duplex (e.g., FDD, TDD) mode is performed, in which each of uplink and downlink is divided into frequency or time, interference does not occur between the uplink and the downlink. However, in an FDR transmission environment, since the uplink and the downlink share the same frequency/time resource, interference may occur between the FDR device and its neighboring device.

Meanwhile, interference of a neighboring cell in the legacy communication system is still valid even in the FDR system but is not handled by the present invention.

Figure 11:
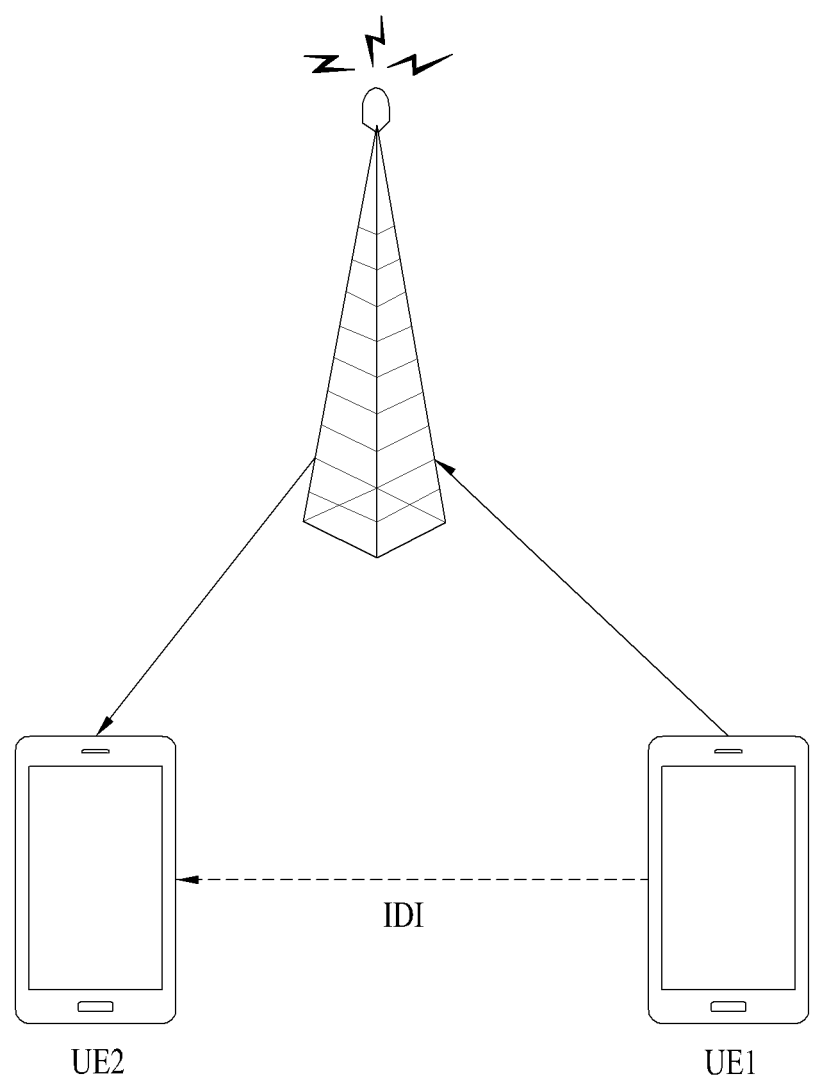
FIG. 11 illustrates an example of inter-device interference.

FIG. 11 illustrates an example of inter-device interference.

As described above, inter-device interference (IDI) occurs in FDR only as the same resource is used within a cell. Referring to FIG. 11, an uplink signal transmitted from a UE1 to an eNB may act as interference to a UE2. FIG. 11 is a simple example illustrating two UEs for convenience of description, and features of the present invention are not limited to the number of UEs.

Figure 12:
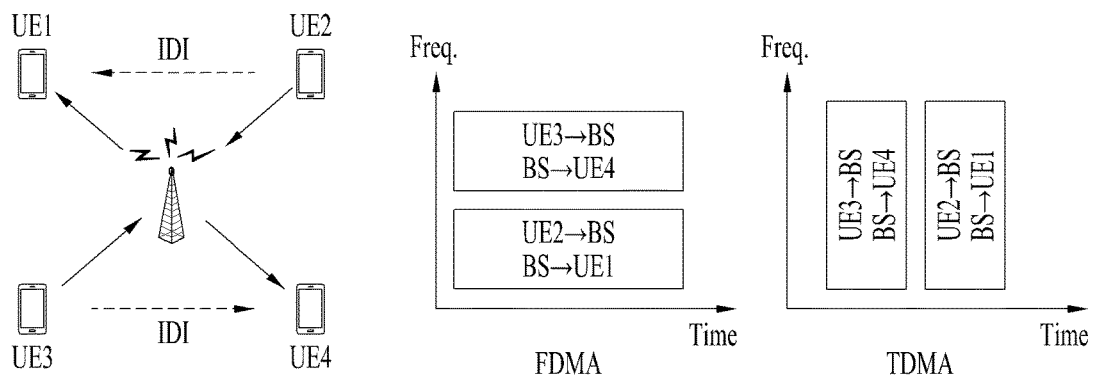
FIG. 12 illustrates an example of FDMA and TDMA operations when an eNB is operated in a full duplex (FD) mode within the same resource and other UEs perform multiple access.

FIG. 12 illustrates an example of FDMA and TDMA operations when an eNB is operated in a full duplex (FD) mode within the same resource and other UEs perform multiple access.

In the FDR system, FD which does not use the same resource as well as FD within the same resource may exist.

Referring to FIG. 12, a total of two groups which perform FD operation within the same resource may be configured. One of the two groups includes a UE1 and a UE2, and the other group includes a UE3 and a UE4. Since IDI occurs within each group which uses the same resource, it is preferable that UEs where IDI occurs rarely are formed as a group.

For example, if interference caused by the UE2 affects the UE4 more greatly than the UE1, the UE1 and the UE2 may become one group as shown in FIG. 12.

Meanwhile, if IDI is too great due to the UE2 and therefore greatly affects the UE1, the UE2 and the UE1 may be configured so as not to use the same resource. For example, in case of FDMA, the group of the UE3 and the UE4 uses the same frequency region, and the UE1 and the UE2 may allocate a total of three frequency bands to use their respective frequency regions different from each other. For this reason, resource consumption is increased but more efficient transmission may be performed in view of entire performance, for example, throughput.

Therefore, although a technique as to which UEs of a plurality of UEs should be included in FD operation within the same resource is required, a problem occurs in that the technique does not exist.

As a similar technique, a technique of measuring inter-cell interference or selecting a cell depending on interference has been used in the field of coordinated multi-point (CoMP). In CoMP, a UE located at the cell edge determines an eNB by measuring interference of neighboring cells. However, interference at this time means signals of various cells that affect one UE, and since the UE does not share UE-to-UE resource, the UE does not consider IDI of a neighboring UE.

As another technique, multi-user MIMO or virtual MIMO method configures a virtual MIMO system with an eNB having multiple antennas by grouping UEs each having one antenna. In the multi-user MIMO, UEs receive DL transmission information on other UE during DL transmission, whereby IDI occurs. At this time, the eNB performs scheduling for UEs orthogonal to a channel of the eNB to avoid IDI. On the other hand, the present invention relates to IDI in FD where DL transmission and UL transmission are simultaneously performed, as well as FD where DL transmission is performed.

In the present invention, a method for determining a group of UEs to avoid and mitigate IDI in a system which uses full-duplex communication within the same resource and measuring and reporting IDI by using the determined group will be described.

In the present invention, a device (e.g., eNB or UE) which supports a full duplex (FD) mode within the same resource will be referred to as an FDR device or eNB or UE.

The FDR device may include a self-interference canceller. The FDR device which includes the self-interference canceller may operate/support the FD mode within the same resource. The FDR device which does not include the self-interference canceller cannot be operated in the FD mode within the same resource but enables information transmission with the FDR device operated in the FD mode within the same resource, thereby supporting the FD mode. That is, the FDR device which does not include the self-interference canceller may perform IDI measurement and reporting. In FIG. 11, the eNB is the FDR device which does not include the self-interference canceller, and the UE1 and the UE2 illustrate an example of the FDR device which does not include the self-interference canceller.

In the present invention, grouping means that a plurality of UEs are grouped in accordance with a specific reference.

The present invention is based on a method for configuring a group by means of an eNB on the basis of IDI information reported by a UE. If an entity for configuring a group becomes an eNB, this method may be referred to as eNB centric grouping.

Hereinafter, the status that the FD mode operation within the same resource is performed in the eNB will be described representatively. However, the present invention may be applied to the status that the UE is operated in the FD mode within the same resource and the status that the UE is operated in the FD mode within the same resource without relay of the eNB like D2D. The description of these statuses will be preceded by the description of the status that the FD mode operation within the same resource is performed in the eNB. These statuses may occur within a cell simultaneously, and will be described respectively for convenience of description in the present invention but may equally be applied to the present invention.

1. First Embodiment

The first embodiment of the present invention relates to an initial configuration method of groups that share the same resource within a cell in a state that FD operation within the same resource may be performed.

Figure 13:
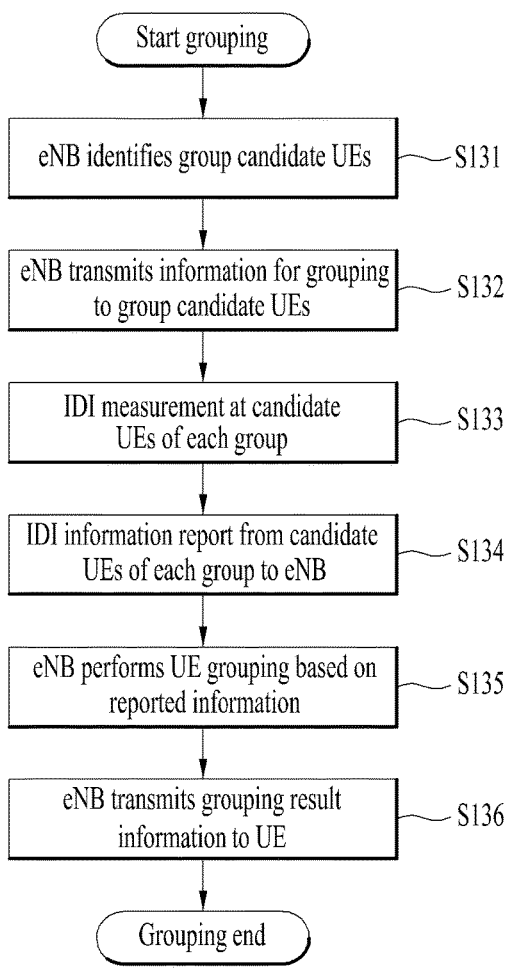
FIG. 13 is a flow chart illustrating a method for configuring initial grouping according to the first embodiment of the present invention.

FIG. 13 is a flow chart illustrating a method for configuring initial grouping according to the first embodiment of the present invention.

Initial grouping indicates grouping for initially applying FD mode within the same resource to a cell.

The initial grouping procedure will be described briefly. First of all, an eNB identifies UEs which desire to participate in grouping (S131). At this time, the eNB may select candidate UEs by considering a capability of managing the FD mode within the same resource. If candidate UEs are selected, the eNB transmits information or indication required for grouping to the candidate UEs (S132). The candidate UEs measure IDI (S133), and report information on IDI to the eNB (S134). The eNB performs grouping of UEs on the basis of the reported information (S135), and transmits information configured as the group to the corresponding UEs (S136).

Hereinafter, each step of FIG. 13 will be described in more detail.

1.1 Identification of Candidate UEs

First of all, at the step S131, the eNB identifies candidate UEs which will be configured as a group.

As a first method for identifying the candidate UEs, the eNB may request all UEs connected thereto of information as to whether UEs participate in grouping. For example, the request information may be transmitted through a DCI format of a PDCCH or E-PDCCH, or a PDSCH. In response to the request information, the UEs may respond whether to participate in grouping. For example, the response information may be transmitted through a UCI format of a PUCCH or PUSCH.

As a second method, each UE transmits a participating request. Each UE may transmit a request for participating in FD mode within the same resource by considering features of data to be transmitted. This information may be transmitted to the eNB through the UCI format of the PUCCH or PUSCH.

As a third method, the eNB knows features of data which will be transmitted from UEs or previously knows information of UEs in a way to recognize UEs which are favorable to participate in FD within the same resource. For example, the UEs are ready to participate in grouping but may not currently participate in the FD mode within the same resource. In this case, the eNB may transmit participating request information to the corresponding UEs. This information may be transmitted through a DCI format of a PDCCH or E-PDCCH or a PDSCH.

In this case, grouping participating information may include information on identification as to an FDR device (which includes a self-interference canceller) which may be operated in the FD mode within the same resource, identification as to an FDR device which cannot be operated in the FD mode within the same resource but supports the FD mode within the same resource, and identification as to an FDR device and whether to request participation in grouping. As described above, the FDR device may include a self-interference canceller, and the FDR device which includes the self-interference canceller may operate/support the FD mode within the same resource. The FDR device which does not include the self-interference canceller cannot be operated in the FD mode within the same resource but enables information transmission with the FDR device operated in the FD mode within the same resource, thereby supporting the FD mode. That is, the FDR device which does not include the self-interference canceller may perform IDI measurement and reporting.

These three kinds of information may be allocated to the UCI format. For example, a total of 3 bits as much as 1 bit for each of the three identifications may be allocated to the UCI format. Each bit may be allocated as '1' if it indicates acknowledgement and as '0' if it indicates non-acknowledgement, or vice versa.

FIG. 14 illustrates an example of grouping participating bit allocation.

For example, if '011' is allocated, it indicates a device which cannot be operated in the FD mode within the same resource but supports the FD mode within the same resource and currently desires to participate in grouping like the UEs of FIG. 11. '000' may be allocated to UEs which do not participate in grouping, whereby the operation in the legacy system may be supported.

The FDR device may modify a grouping participating request bit by considering transmission data features, a remain power profile, a buffer status, etc. Also, the FDR device may be configured so as not to use the FD mode operation and support to reduce a time required to identify a bit allocated from the eNB to the UE.

A bit of the FD mode operation and support is preferably transmitted only if a UE first participates in grouping or is excluded from a group after group configuration and then participate in grouping. If group configuration is completed, the eNB may manage UEs in such a manner that UEs which support the FD mode only together with UE_ID may be set to '0' and UEs which may be operated in the FD mode may be set to '1'.

The UEs which may be operated in the FD mode may additionally allocate a bit, which indicates an operation method in the FD mode, to the UCI format. For example, if the corresponding bit is '0', it indicates the FD mode support, and if the corresponding bit is '1', it indicates the FD mode operation to indicate the operation method. The eNB may identify the bit operated in the FD mode and use the bit for resource allocation.

1.2 Information Transmission for Grouping

Next, at the step S132, the eNB transmits information for grouping to the candidate UEs selected based on the step S131.

Examples of information for grouping may include selection of candidate UEs, frequencies which will be used equally, and the number N of grouping candidate UEs. The eNB may transmit the information for grouping by allocating a bit to the DCI format of the PDCCH or the PDSCH.

The eNB may restrict management UEs due to the number of manageable UEs. Also, the eNB may report the UEs, which are reported to be capable of participating in grouping at the step S131, whether the UEs have been selected as grouping candidate UEs. At this time, it is preferable that the UEs which are not selected as the candidate UEs by the eNB are operated in a fallback mode. In this case, the fallback mode indicates that the UEs are operated in either a half-duplex mode as before or an FD mode within another frequency.

1.3 IDI Measurement

Next, at the step S133, the grouping candidate UEs measure IDI based on (N−1) number of neighboring UEs except self-UE. IDI measurement of the neighboring UEs may be performed as follows.

Since IDI occurs due to use of the same resource, one UE performs uplink signal transmission at each subframe for a total of N number of subframes and the other (N−1) number of UEs receive downlink signals, whereby RSRP (Reference Signal Received Power) or RSRQ (Reference Signal Received Quality) of IDI may be measured.

A size of IDI for each target UE may be defined by a function having factors such as a distance between a measurement UE and a target UE, a transmission power of a target UE, and a transmission direction of a target UE.

Meanwhile, all of N number of UEs included in the grouping candidates may be measurement UEs. At this time, a signature for UE identification may be used.

1.4 IDI Information Report

Next, at the step S134, N number of UEs may transmit UE identifier or index and information on measured IDI to the eNB. Information transmission of the measured IDI may be performed as follows.

A first method is to transmit brief IDI information, and each UE may align IDI values measured for neighboring UEs in an ascending order or descending order, and may transmit the aligned order (index value) and UE_ID of the corresponding neighboring UEs to the eNB through the UCI format of the PUCCH or PUSCH. The first method may reduce the amount of transmission more than transmission of detailed information by transmitting the aligned order.

A second method is to transmit detailed information, and each UE may transmit UE_ID of the neighboring UEs and quantized information for measured IDI values corresponding to UE_ID to the eNB through the UCI format of the PUCCH or PUSCH.

As a third method, a hybrid method of the first method and the second method may be used by a request of the eNB. For example, the aligned order and UE_ID like the first method may be transmitted and at the same time quantized information for some UE_ID like the second method may be transmitted. Also, for all UE_IDs, the information of the second method may be transmitted at a long period and the information of the first method may be transmitted at a short period.

Also, at the step S134, additional information, which may be reflected in grouping, as well as information on IDI may be transmitted.

For example, quantized information on IDI processing capability of the UE may be transmitted (through UCI format of the PUCCH or PUSCH). Alternatively, the best band from a CSI channel fed back from the UE, a remain power profile of the UE, etc. may be transmitted (through UCI format of the PUCCH or PUSCH).

1.5 Grouping

Next, at the step S135, the eNB performs grouping based on the information received at the step S134, and configures group ID of each UE.

Grouping may be performed based on a size of IDI and the order of IDIs aligned in size. Also, if information other than the IDI measurement value has been additionally received, grouping may be performed using this information.

The eNB may configure a group by considering a specific threshold for IDI of each UE or a predetermined size of each group. At this time, the threshold may be determined depending on IDI mitigation or cancellation algorithm performance.

The size of each group (the number of UEs included in each group) may previously be determined considering available resources. Alternatively, the IDI value may be included in the group only if the IDI value is a specific threshold or more/less, whereby the size of the group may be set. A size of a minimum group is 1, corresponds to that IDI value is outside the threshold, and indicates that a specific resource is allocated to a corresponding UE only. That is, this is like the operation of the fallback mode.

As a first method of the IDI based grouping method of the eNB, a group of UEs which generate a lot of IDIs may be configured. For example, a group of UEs of which IDI value is a specific threshold or more may be configured. This grouping may be defined as worst relation based grouping. That is, UEs having great IDI to each other are grouped in one group.

As a second method of the IDI based grouping method of the eNB, a group of UEs which generate IDI rarely may be configured. For example, a group of UEs of which IDI value is a specific threshold or less may be configured. This grouping may be defined as best relation based grouping. That is, UEs having small IDI to each other are grouped in one group.

Resource allocation within the group may be performed as follows in accordance with each of the groups configured by the above two methods.

In the worst relation based group, since the IDI value between UEs within the group is greater than the threshold, if the same resource is used between UEs within the group, IDI avoidance technique (e.g., beamforming technique) may be used. Also, intra group UEs may be multiplexed by FDM to avoid interference, and inter group UEs may be configured to be operated/supported in the FD mode within the same resource. For the FD mode operation/support within the same resource of inter group UEs, a successive cancellation (SC) method which is an interference cancellation technique is desirably used. This is because that the SC method has good cancellation performance if a signal strength difference between interferences becomes great.

In the best relation based group, intra group UEs may be configured to be operated/supported in the FD mode within the same resource, and inter group UE may be multiplexed by FDM to avoid interference.

The FD mode within the same resource may be performed between the worst relation based group and the best relation based group. In this case, the successive cancellation (SC) method which is an interference cancellation technique is desirably used. As described above, this SC method has good cancellation performance if a signal strength difference between interferences becomes great. For example, if a first UE, a second UE included in the worst relation group with the first UE, and a third UE included in the best relation group are selected from the eNB and three UEs are supported in the FD mode within the same resource, the SC method is sequentially applied to the second UE in the worst relation group and the third UE in the best relation group, whereby better performance is obtained than the case that UEs within the same relation group are only selected.

1.5.1 Example of Worst Relation Based Grouping

FIG. 15(a) illustrates that an eNB for cell-specific grouping and 8 UEs are arranged, and FIG. 15(b) illustrates an example of group configuration when worst relation based grouping is completed. In this case, eNB and UE arrangement is illustrated on the assumption that IDI is proportional to a distance between UEs.

FIG. 16 illustrates that UEs are aligned in the order of IDI values from highest to lowest on the basis of IDI measured by each UE of FIG. 15(a). In FIG. 16, a first column indicates UEs which desire to measure IDI, and a first row indicates IDI measurement target UEs.

For example, a second row of FIG. 16 illustrates that IDI is measured in the order of d, g, b, e, f, h and c when 'a' measures IDI of other UEs. This method corresponds to the first method in the IDI information reporting method of 1.4. In more detail, a value of great IDI has a low index value. Hereinafter, although grouping is performed based on that a value of great IDI has a low index value, grouping may be performed based on that a value of great IDI has a high index value.

If the measurement UE is the same as the target UE, since it indicates a meaningless relation and also indicates that IDI measurement is not performed, the corresponding UE is marked with '0'.

An average value of each row in FIG. 16 is as illustrated in FIG. 17. The average value of each row may relatively indicate a spacing level of a measurement UE spaced apart from a center among all UEs.

Hereinafter, a detailed procedure of grouping UEs as illustrated in FIG. 15(b) by performing worst relation based grouping based on the measurement value of FIG. 16 in the arrangement of eNB and UEs of FIG. 15(a) will be described.

FIG. 18 illustrates selection of UEs for configuring a first group.

Since a low number (index value) in a table indicates that IDI of target UEs affecting measurement UEs is great, the target UEs that greatly affect each measurement UE are selected. In the example of FIG. 18, three values (three low values) having great IDI in each column are selected. In this case, selection of three values is randomly configured, and may be varied depending on a total number of groups. Also, in this example, the same values are all selected, but the present invention is not limited to this example.

For example, 2 which is the lowest value is selected from a first column of FIG. 18. Two 2 are selected from (d-a) and (g-a) when (row-column) is marked. Since the three values are selected, 7 which is next value is selected. Since the same values are all selected, all values are selected in a first column.

A second column of FIG. 18 will be described. The lowest value in the second column is 1 and one of (e-b) is selected. The secondary low value is 3, and if the same values are all selected, (a-b), (d-b), (g-b) and (h-b) are selected.

A third column of FIG. 18 will be described. The lowest value in the third column is 1 and 2 of (f-c) and (h-c) are selected. The secondary low value is 4, and one of (e-c) is selected, whereby a total of three values are selected.

The other columns are selected as above, and the selected values are shaded in FIG. 18.

Afterwards, an average of each row for selected target UEs is obtained. The right-most column of FIG. 18 indicates a corresponding average value. The low average value may be determined that a small number of target UEs affect the measurement UEs. This is because that three target UEs having low values are selected. Also, the low average value may mean that the measurement UEs are biased towards any one side. In the example of FIG. 15(a), it is noted that an average value of UEs a, d and g biased to one side is low. On the contrary, the high average value may mean that the measurement UEs are greatly affected by many UEs.

Therefore, if the size of a first group is determined as 3, the UEs a, d and g having the lowest average value are configured as the first group.

FIG. 19 illustrates that target UEs are selected like FIG. 18 for the other UEs except UEs a, d and g of which group is determined.

For example, 1 which is the smallest value is selected from a first column, and 3 which is a secondary small value is selected. For example, in case of a third column, 1 which is the smallest value is selected, and then 3 is selected, whereby the same values are all selected. In this way, values in each column are selected.

Next, in the same manner as FIG. 18, an average of each row for the selected target UEs is obtained. The last column of FIG. 19 indicates a corresponding average value. The low average value means that a small number of target UEs affect the measurement UEs. Therefore, if the size of a second group is determined as 2, the UEs b and e having the lowest average value are configured as the second group.

Grouping may repeatedly be performed for the other UEs. In the example of FIG. 15, a total of three groups are configured.

As described above, although worst relation based grouping has been described in 1.5.1 based on that a value having great IDI has a low index value, worst relation based grouping may be performed based on that a value having great IDI has a high index value. In this case, high index values are selected as much as a given number in FIG. 16, and the aforementioned method may equally be applied based on that an average of each row is high.

1.5.2 Example of Best Relation Based Grouping

FIG. 20 illustrates IDI values are aligned from lowest to highest contrary to FIG. 16, and is intended to configure a first group based on best relationship. That is, a value which is 1 in FIG. 16 becomes 7, a value which is 2 in FIG. 16 becomes 6, and a value which is 7 in FIG. 16 becomes 1. This method corresponds to the first method in the method for reporting IDI information in 1.4, and a value having low IDI has a low index value in this method. Hereinafter, although grouping is performed based on that a value having low IDI has a low index value, grouping may be performed based on that a value having low IDI has a great index value.

The low values in the table indicates that the target UEs affect the measurement UEs at a low level.

First of all, target UEs that affect each measurement UE at a low level (low value) are selected. In the example of FIG. 20, a size of each group is set to 2, and two values are selected from each column in the order from smallest to largest. In this case, the size of the group and the selected values are set to 2 randomly, and may be varied depending on a total number of groups. Also, in this example, the same values are all selected, but the present invention is not limited to this example. Also, since a value having the greatest IDI should satisfy a threshold or less in the best relation, target UEs may not be selected depending on the threshold. If the target UEs are not selected, frequencies/times different from each other may be allocated to the corresponding UEs. Hereinafter, the embodiment that an IDI measurement value is a threshold or less will be described.

Since a low value is given based on that an IDI value is low and two low values are selected, if many UEs are selected from each column, it indicates that the target UEs are far away from the measurement UEs. For example, 5 selections exist in the target UE 'a', and it is noted that the target UE 'a' is located at the edge in FIG. 15(a).

For best relation grouping, in order that the greatest IDI less affects corresponding UEs, a small number of UEs are selected from each column, and UEs most affected by IDI are selected. For example, UEs of which the number of values selected from each column is small are b and h, and the values selected from each column are small like 2. Then, the UE most affected by IDI means that a corresponding value is great. Since a value selected from a column of the UE 'b' is 4 greater than 2 selected from a column of the UE 'h', the UE 'b' is selected. That is, in FIG. 20, a measurement UE 'c' or 'f' may be grouped with respect to the target UE 'b'.

FIG. 21 illustrates that UEs b and c are configured as a group and then target UEs except the UEs b and c are selected to configure a second group like FIG. 20.

If the same method as the first grouping is used, d, which corresponds to 3, i.e., the greatest number, among d, g and h, of which the number of values selected from each column is small, is selected.

Likewise, FIG. 22(a) illustrates selection of target UEs for configuring a third group, and FIG. 22(b) illustrates selection of target UEs for configuring a fourth group. Based on this selection, UEs 'g' and 'e' may be configured in FIG. 22(a), and UEs 'a' and 'h' may be configured in FIG. 22(b).

Figures 22, 23:
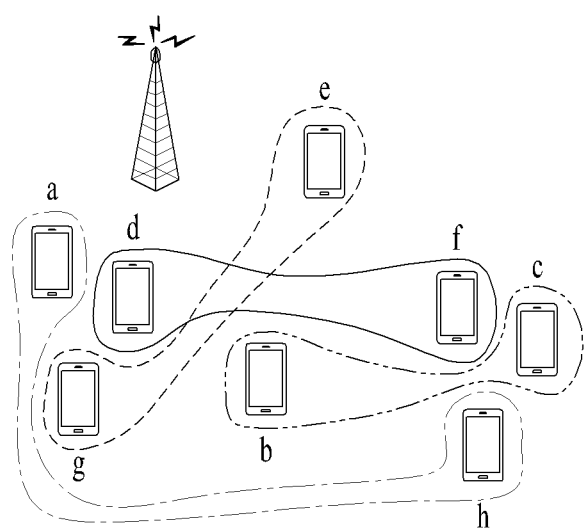
FIG. 22 illustrates selection of target UEs after FIG. 21.
FIG. 23 illustrates an example of a group configured based on best relationship.

That is, if group configuration is performed based on best relation in case of FIG. 15(a), a group may be configured as shown in FIG. 23. That is, each pair of UEs 'b' and 'c', UEs 'd' and 'f', UEs 'g' and 'e', and UEs 'a' and 'h' is configured in one group.

As described above, although worst relation based grouping has been described in 1.5.2 based on that a value having small IDI has a low index value, worst relation based grouping may be performed based on that a value having small IDI has a high index value. In this case, high index values are selected as much as a given number in FIG. 20, and the aforementioned method may equally be applied.

Also, grouping may be performed using a quantized IDI measurement value instead of the index value. That is, the eNB may perform grouping of UEs that satisfy a threshold by directly using a direct IDI value. For example, in case of worst relation based grouping, UEs having IDI value greater than a specific threshold may be grouped in one group. In case of best relation based grouping, UEs having IDI value less than a specific threshold may be grouped in one group.

At this time, a size of each group should simultaneously satisfy a predetermined group size and a threshold. For example, a size of a random group is previously set to 3, and in this case, if the number of UEs that satisfy the threshold is 2, the size of this group should be 2.

1.6 Grouping Result Information Transmission

Next, at the step S136, the eNB may transmit information on a configuration group to UEs.

In more detail, the information on a configuration group may be provided depending the amount of downlink transmission as follows.

As a first method, the eNB may transmit, to all UEs, ID only of a group to which each UE belongs. For example, the eNB may transmit group ID information by allocating a bit through a DCI format of a PDCCH, or a PDSCH. Each UE may measure IDI for UEs except UEs within the group to which each UE belongs.

As a second method, the eNB may transmit, to all UEs, ID of a group, to which each UE belongs, and neighboring group ID. For example, the eNB may transmit ID of a group, to which each UE belongs, and neighboring group ID through a PDCCH or PDSCH. The eNB selects group ID, which satisfies a specific threshold or more/less, as neighboring group ID by using reported IDI information and transmits the selected group ID. Afterwards, each UE within the group ID may reduce load of IDI measurement by measuring IDI for only UEs which belong to the received neighboring group ID.

As a third method, the eNB may transmit, to all UEs, every group ID and UE_ID which belongs to a corresponding group. For example, the eNB may transmit this information through a PDCCH or PDSCH. Unlike the second method, each UE measures IDI for one UE per group ID during IDI measurement and then measures IDI for UEs which belong to a group that satisfies a specific threshold or more/less, whereby load of IDI measurement may be reduced.

Meanwhile, information transmitted to the UEs may include measurement/report period information, and may be transmitted through higher layer signaling such as RRC.

2. Second Embodiment

The second embodiment of the present invention relates to a method for grouping update after initial grouping of the first embodiment is performed.

Grouping update means that group configuration may be maintained or updated by IDI re-measurement and reporting in a state that a group is configured and operated in an FD mode within the same resource. The configured group may be changed by participation of a new candidate UE or group withdrawal of a previous candidate UE.

Figure 24:
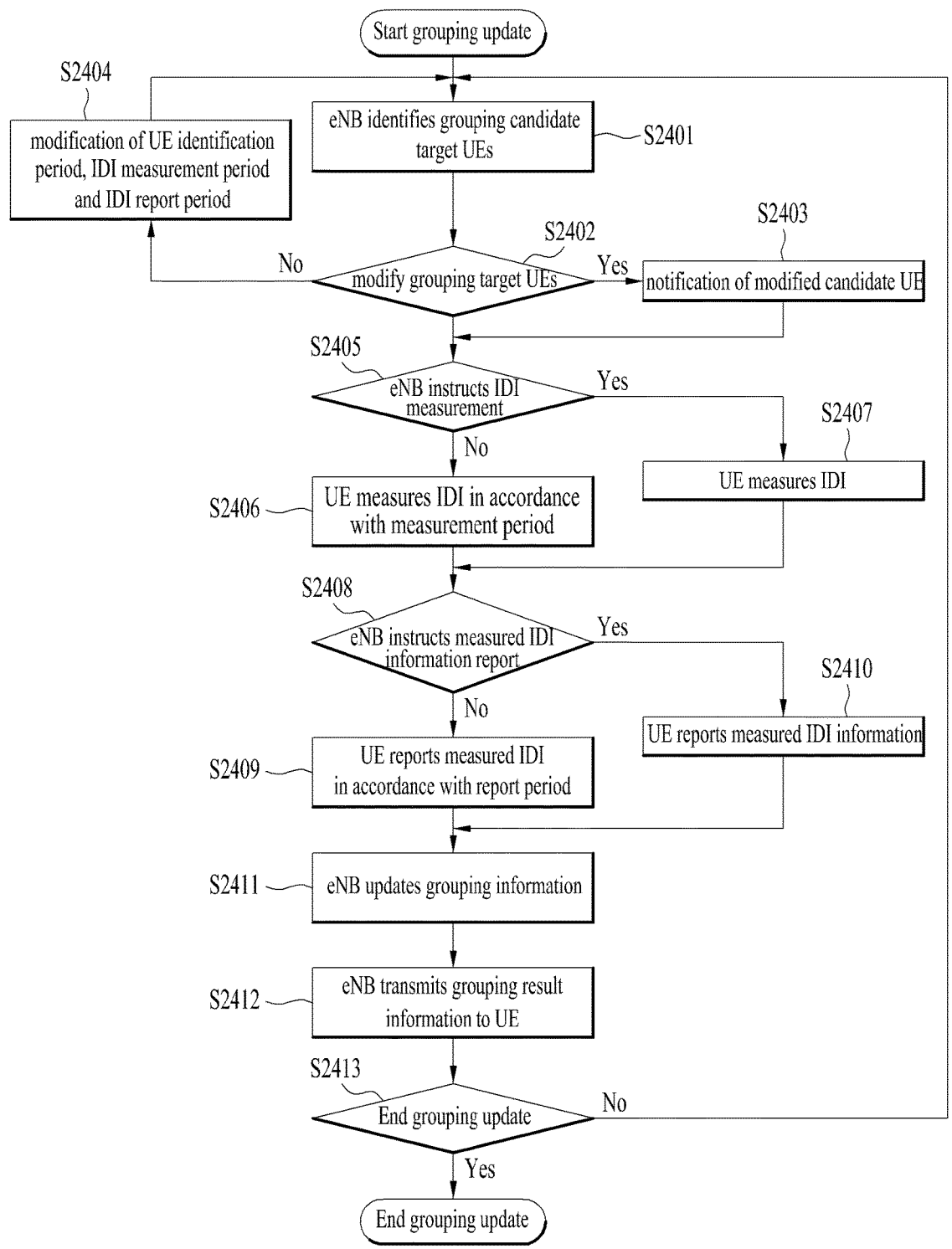
FIG. 24 is a flow chart illustrating the second embodiment for grouping update.

FIG. 24 is a flow chart illustrating the second embodiment for grouping update.

First of all, a grouping update procedure will be described briefly. The eNB identifies candidate UEs who will participate in grouping or the presence of UEs which desire to quit participation in an FD mode within the same resource (S2401). If there is a new candidate UE, the eNB additionally notifies all groups that the corresponding candidate UE is an IDI measurement target, and notifies groups for measuring the corresponding UE of a UE which desires to quit participation in an FD mode (S2403). If there is no UE which will be modified, the eNB may modify a UE identification period, an IDI measurement period, and an IDI report period (S2404). IDI measurement at the UE may be performed in accordance with a predetermined period (S2406) or instructions of the eNB (S2407). The IDI measurement UE may report IDI information to the eNB in accordance with a predetermined period (S2409) or instructions of the eNB (S2410). The eNB updates group information of the UEs on the basis of the reported information (S2411), and transmits the updated group information to the corresponding UEs (S2412).

Hereinafter, each step of FIG. 24 will be described in detail.

2.1 Grouping Candidate UE Identification

First of all, at the step S2401, the eNB identifies whether there is a new candidate UE which will participate in grouping or a UE which desires to quit participation in FD mode within the same resource.

The UE which desires to quit participation in the FD mode is operated in a fallback mode.

2.1.1 Method for Identifying Grouping Candidate UEs

The eNB may identify a UE, which participates in FD mode within the same resource, as follows.

As a first method, an FDR device allocates a bit, which indicates whether a corresponding UE has been included in a group, to a UCI format of a PUCCH or PUSCH as 1 bit, and identifies a candidate UE which participates in grouping or cancels grouping through the eNB by simultaneously using the above bit and a bit for a grouping participation request in FIG. 14. For example, if the grouping participation request bit is '1' and the bit indicating whether the corresponding UE has been included in a group is '0', it is noted that the corresponding UE is a new candidate UE which will participate in grouping.

FIG. 25 illustrates an example of identifying grouping candidates by using a grouping participation request and whether grouping candidates are included in a group.

As a second method, the FDR device identifies candidate UEs which participate in grouping or cancel grouping through the eNB by using the bit for grouping participation request in FIG. 14. If the eNB stores group ID for a configured group and UE_ID included in the group, the IDs may substitute for an allocation bit as to whether the corresponding UE is included in the group. For example, if the grouping participation request bit is '1' and UE_ID of the corresponding UE does not exist in the stored UE_ID, the corresponding UE may be determined as a new UE which will participate in grouping.

As a third method, the eNB transmits the grouping participation request bit by considering the state (for example, corresponding group ID reception) that the UE is included in the group. In this case, the grouping participation request bit may substitute for an allocation bit as to whether the corresponding UE is included in the group. At this time, if the grouping participation request bit is '0', the eNB may identify the corresponding UE as a UE which quits participation in FD mode, and if the grouping participation request bit is '1', the eNB may identify the corresponding UE as a new UE which will participate in grouping.

2.1.2 Grouping Candidate Identification Period

The eNB may perform grouping update at a certain period. In more detail, grouping update may be performed for the UE which participates in FD mode through the steps S2403 and S2405. Period and operation of grouping candidate UE identification may be as follows.

As a first method, the eNB identifies grouping candidate UEs whenever performing grouping update.

As a second method, the eNB periodically identifies grouping candidate UEs in accordance with a candidate UE identification period. The candidate UE identification period may be fixed, or may be gradually long in an environment that a group is not changed frequently. At this time, if the group is modified or the grouping candidate UEs are identified, the longer period may again be set to the first set period.

In more detail, the candidate UE identification period may be determined as follows relatively to the grouping update period. As a first method of the candidate UE identification period, candidate UEs may be identified at a period shorter than the grouping update period. The candidate UE identification period may be used for the case where the UE which quits participation in FD mode is previously identified for some groups every candidate UE identification period. As second method of the candidate UE identification period, the candidate UEs may be identified at a period greater than the grouping update period. In this case, it is advantageous that load for candidate UE identification may be reduced. If grouping update is performed at a period where the candidate UEs are not identified, it may be identified that there is no change of UEs for grouping at the step S2402.

As a third method, the eNB may identify the grouping candidate UEs by responding to a UE request when the UE request occurs. For example, a UE which newly participates in grouping may request the candidate UE identification period through power-on of UE, activation of the FDR device from a user, etc. Or, the UE which requests to quit the FD mode may request the candidate UE identification period due to power-off of UE, deactivation of the FDR device from a user, a remain battery profile. The candidate UE identification period may be determined by an immediate identification period or a certain set period. Or, the UE may request grouping update even for a case where UE movement between groups occurs.

Moreover, the second method and the third method may be used at the same time to increase the period. In this case, it is advantageous that load for candidate UE identification may be reduced.

2.1.3 Grouping Candidate UE Identification During Group Movement of UEs

As described above, grouping update may be required for even a case where existing group configuration UEs perform movement between groups as well as a case of a new candidate UE which will participate in grouping or a UE which desires to quit participation in FD mode within the same resource. The operation during movement between groups of UEs may be performed as follows.

As a first method, grouping update for all UEs is performed every grouping update or at a certain period.

As a second method, if a state of a UE is modified to a certain reference or more, for example, in case of fast movement of a UE, the corresponding UE may be operated in a fallback mode. This is like quitting participation in FD mode, and the corresponding UE may be excluded during grouping update and operated as a new candidate UE which will participate in grouping during next update timing.

As a third method, a new candidate UE which will participate in grouping may directly transmit a request. For example, the UE may transmit a grouping participation request bit and a bit as to whether the corresponding UE is included in the group by allocating the grouping participation request bit as '1' and the bit as to whether the corresponding UE is included in the group as '0'. If the eNB receives this request, the eNB searches for corresponding UE_ID within an IDI measurement target list or whether there is configured group ID. If there is configured group ID but the bit of 0 as to whether the corresponding UE is included in the group is received, the eNB may perform grouping update.

2.1.4 Method for Allocating IDI Measurement Frequency to Grouping Candidate UE

At the step S2401, the eNB may allocate frequency for IDI measurement to grouping candidate UEs as illustrated in FIG. 26.

FIG. 26(a) illustrates an example of allocation of common frequency fco for IDI measurement to all UEs. At this time, a time for N number of subframes is used to allow a total of N UEs to measure IDI like the step S1303.

FIG. 26(b) illustrates an example that IDI measurement frequency allocation is different in a first time domain and a second time domain.

In the second time domain, if the grouping participation request bit and the bit as to whether the corresponding UE is included in the group are all '1', exclusive frequencies f1, f2 and f3 are allocated to each group for some time. UEs within each group commonly use the frequencies allocated to the groups.

In the first time domain, if the grouping participation request bit is '1' and the bit as to whether the corresponding UE is included in the group is '0', that is, if a UE which will newly participate in grouping exists, to measure this UE, a common frequency fco is allocated to all UEs.

For example, if the number of respective UEs included in three groups is A and the number of UEs which newly participate in grouping is B, exclusive frequencies are allocated for a time of a total of A subframes and a common frequency is allocated for a time of a total of B subframes. At this time, the B UEs transmit uplink signals for B subframes, and the other 3*A+(B−1) UEs receive downlink signals for the same subframe time, whereby IDI measurement may be performed.

A time of a total of (3*A+B) subframes is required for IDI measurement in the method of FIG. 26(a), and a time of a total of (A+B) subframes is required for IDI measurement in the method of FIG. 26(b).

In case of a UE which is likely to be re-grouped in another group due to movement of UEs within the group in the method of FIG. 26(b), since a channel environment may not be reflected well, the above two methods may be used at the same time at a different period. Hereinafter, for convenience of description, movement of UEs between groups is included in modification of grouping candidate target UEs.

2.2 Modification of Grouping Target UEs

At the steps S2402 and S2403, after completely identifying grouping candidate target UEs through the step S2401, the eNB may transmit information on a UE, which will be modified, as follows.

First of all, the eNB may newly allocate UE_ID to a UE which will newly participate in grouping and notify grouping update target UEs (another new UE which desires to participate in grouping and all UEs within the current group except a UE which will quit participation in FD mode) of corresponding UE_ID or IDI measurement target list which includes the corresponding UE_ID. This information may be transmitted through a PDCCH or PDSCH. The IDI measurement target list may include UE_ID for grouping date target UEs or UE_ID of UEs which belong to some groups.

Also, the eNB may transmit the UE_ID or the IDI measurement target list to all UEs within the current group except the UE which quits participation in FD mode, or a group to which the modified UE belongs, by considering scheduling, available resources, etc. This information may be transmitted through a PDCCH or PDSCH.

At the step S2402, if there is no UE which will be modified, the eNB may transmit the IDI measurement target list through the PDCCH or PDSCH. Alternatively, the eNB may allocate a bit, which indicates that a previous IDI measurement target list should be reused, and may transmit the bit through a PDCCH or PDSCH.

If the UE fails to receive the UE_ID or the IDI measurement target list or a previous list reuse indicator (regarded as the IDI measurement target list for convenience of description), a previous list may be reused. In this case, even though the UE fails to receive the UE_ID for the UE which quits participation in FD mode, since there is no corresponding UE_ID during IDI measurement, a measurement value is not obtained. Also, if the UE which has not received the list fails to receive UE_ID for the UE which will be added to grouping, the UE may identify that there is IDI exceeding measured total IDI size and notify the eNB of the identified IDI. Alternatively, if the UE fails to receive the IDI measurement target list, the UE may request the eNB of retransmission.

At the step S2404, for the UE identification period, the IDI measurement period, and the IDI report period, which are determined by the eNB, if there is no UE which will be modified or if there is no UE, which will be modified, within a certain time, the eNB may increase the corresponding period. At this time, the eNB may increase the corresponding period by identifying the case where group configuration is not modified additionally, the case where an IDI alignment order within the group is not modified, or the case where IDI size change of a specific value or less within the group occurs.

2.3 Interference Measurement

At the steps S2405 and S2407, the eNB may instruct grouping update target UEs to measure IDI. The UEs instructed to measure IDI may immediately measure IDI. Alternatively, the eNB may instruct some groups, which include UEs quitting participation in FD mode, to measure IDI. The eNB may instruct IDI measurement even in the case that the measurement period exists like the step S2406. For example, if the measurement period is long and modification of the grouping target UEs does not occur frequently, the eNB may instruct IDI measurement when modification of the grouping target UEs occurs.

At the step S2406, the eNB may periodically measure IDI by using the measurement/report period included in the information transmitted from the eNB to the UE at the step S1306 or S2412 or a period set by a system parameter. Periodic measurement of IDI at the UE may be performed as follows.

As a first method, a time X or TTI (Transmit Time Interval) period is set by system parameter, whereby IDI measurement is performed for all UEs.

As a second method, a time Y or TTI period, which is different from the time X or TTI, is set by system parameter, whereby IDI measurement is performed only for some groups which include UEs quitting participation in FD mode. A case of Y>X may occur depending on the modification frequency of grouping target UEs.

Also, the above two methods may be used at the same time, and in this case, load of IDI measurement may be reduced.

The UE measures IDI by using frequency allocated for IDI measurement through the step S2401.

Meanwhile, at the steps S2406 and 2407, the UE may reject IDI measurement due to a remain battery profile.

2.4 Interference Information Report

Next, at the steps S2408 and S2410, the eNB may instruct grouping update target UEs to report measured IDI information. The UEs instructed to report measured IDI information may immediately report the measured IDI information. Among the measurement UEs, only UEs of a group of which IDI alignment order is modified or IDI size change of a specific value or more occurs may report the measured IDI information. Even in the case that the report period exists like the step S2409, if the eNB instructs some groups of UEs, which quit participation in FD mode, to measure IDI at the step S2405, the eNB may instruct UEs of the corresponding groups to report the measured IDI information.

At the step S2409, the UE may periodically report UE index and information on IDI in the form of S134 by using the measurement/report period included in the information transmitted from the eNB to the UE at the steps S136 and S2412 or using the period set by system parameter. Periodic interference information report at the UE may be performed as follows.

As a first method, a time X or TTI (Transmit Time Interval) period is set by system parameter, whereby IDI measured for all UEs and UE index may be reported.

As a second method, a time Y or TTI period, which is different from the time X or TTI, is set by system parameter, whereby measured IDI and UE index may be reported to only some groups which include UEs quitting participation in FD mode. A case of Y>X may occur depending on the modification frequency of grouping target UEs.

The above two methods may be used at the same time, and in this case, load of IDI information report may be reduced.

At the steps S2409 and S2410, if IDI alignment order is not modified or IDI size change of a specific value or less occurs, the UE may not report the IDI information. Instead, the UE may transmit an indicator, which indicates a reference of a previous report, to the eNB through a PUCCH or PUSCH. In this case, the steps S2411 and S2412 may be omitted. The UE may additionally transmit, to the eNB, information other than IDI measurement value based information, which may be reflected in grouping, as well as information on IDI like the step S134.

If the eNB fails to receive a report from the UE for a certain time, the eNB may perform the steps S2411 and S2412 by referring to the previous report as default. Alternatively, the steps S2411 and S2412 may be omitted.

As described above, at the steps S2406 and S2407, the UE may reject IDI measurement due to a remain battery profile and the like. That is, the corresponding UE may not perform identification signal transmission between UEs and a method for attempting listening. At this time, at the steps S2409 and S2410, the UE may allocate a bit, which indicates that IDI measurement has been rejected, and may transmit the bit through a PUCCH or PUSCH. Alternatively, the corresponding UE may not perform any report, and the eNB may identify a UE, of which IDI measurement value is remarkably reduced, through another UE while waiting for the UE's report. As a result, the eNB may know that the identified UE is the one which has rejected IDI measurement.

2.5 Grouping Information Update

At the step S2411, grouping may be performed in the same manner as the step S135. Also, the eNB may store previous group ID allocated to each UE. Therefore, the eNB may identify UEs of which group ID is modified frequently, and may perform the following operations.

First of all, if a plurality of group IDs are allocated to one UE, the eNB may know that the corresponding UE is at the edge of the groups. An IDI measurement value at this UE may be used as a threshold used for grouping.

Secondly, if group ID which is not repeated within a certain time is allocated to a random UE, the eNB may know that the corresponding UE is moving. If this UE occurs, since IDI measurement/report and grouping should always be performed, to reduce this procedure, the corresponding UE may be operated in a fallback mode and may be removed in the FD mode within the same resource.

The step S2412 may be performed equally to the step S136. Also, if a grouping result is not changed due to grouping performed at the step S2411, the eNB may transmit a signal, which indicates that grouping information previously transmitted to UEs should be maintained continuously, to UEs which belong to a group of which grouping result is not changed. This information may be notified by allocating 1 bit to a DCI format of a PDCCH, or a PDSCH.

At the step S2413, if there is no grouping participation request any more at the step S2413, grouping update ends.

The present invention may be applied to even a state that a UE is operated in FD mode within the same resource.

FIG. 27 illustrates an example that a UE performs an FD mode operation within the same resource.

Since the UE may receive IDI from the eNB as illustrated in FIG. 27(a), the eNB may be regarded as a UE in the invention, whereby the present invention may be applied to the eNB. At this time, IDI report procedure and grouping result information transmission within the eNB are not performed.

Also, the present invention may be applied to even the case that the UE performs FD mode operation within the same resource in a state that there is no data relay of the eNB like D2D of FIG. 27(b). Although data transmission through the eNB is not performed in D2D, the UE performs feedback of the eNB for scheduling management at the eNB. Therefore, the procedure of the present invention may be performed equally.

Figure 28:
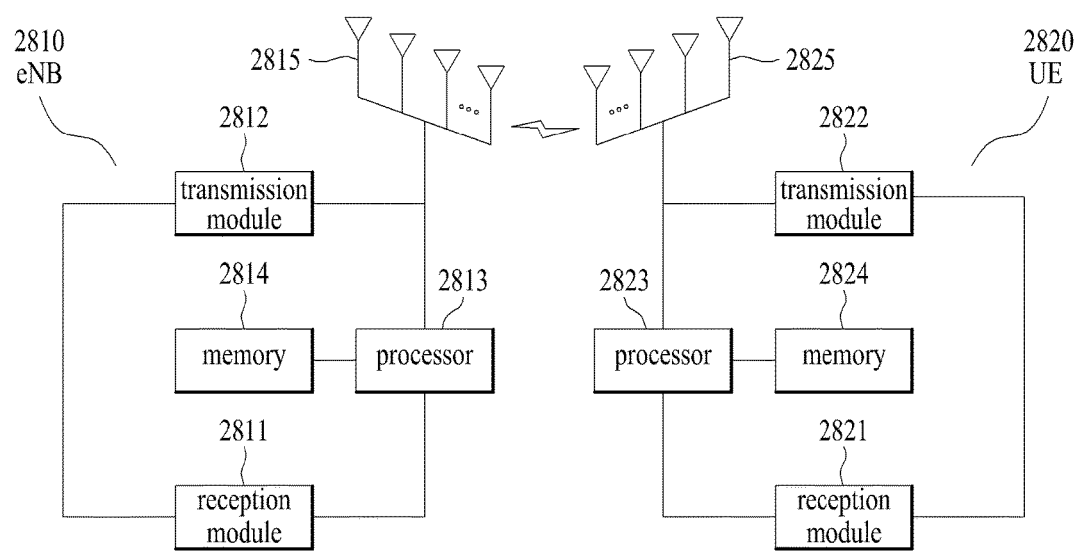
FIG. 28 illustrates an eNB and a UE, which may be applied to one embodiment of the present invention.

FIG. 28 illustrates an eNB and a UE, which may be applied to one embodiment of the present invention.

If a relay is included in a wireless communication system, communication in a backhaul link is performed between the eNB and the relay and communication in an access link is performed between the relay and the UE. Therefore, the eNB or the UE as shown may be replaced with the relay depending on the circumstances.

Referring to FIG. 28, the wireless communication system includes an eNB 2810 and a UE 2820. The eNB 2810 includes a processor 2813, a memory 2814, and radio frequency (RF) units 2811 and 2812. The processor 2813 may be configured to implement procedures and/or methods suggested in the present invention. The memory 2814 is connected with the processor 2813 and stores various kinds of information related to the operation of the processor 2813. The RF unit 2816 is connected with the processor 2813 and transmits and/or receives a radio signal. The UE 2820 includes a processor 2823, a memory 2824, and radio frequency (RF) units 2821 and 2822. The processor 2823 may be configured to implement procedures and/or methods suggested in the present invention. The memory 2824 is connected with the processor 2823 and stores various kinds of information related to the operation of the processor 2823. The RF units 2821 and 2822 are connected with the processor 2823 and transmits and/or receives a radio signal. The eNB 2810 and/or the UE 2820 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed. In this specification, a specific operation which has been described as being performed by the eNB may be performed by an upper node of the eNB as the case may be. In other words, it will be apparent that various operations performed for communication with the UE in the network which includes a plurality of network nodes including the eNB may be performed by the eNB or network nodes other than the eNB. The eNB may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

The preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention may be used for wireless communication systems such as UE, relay, and eNB.

The invention claimed is:

1. A method for allocating resources by an e-Node B (eNB) in a wireless access system supporting full duplex radio (FDR), the method performed by the eNB and comprising:
receiving, from a first user equipment (UE), group participation information;
determining, based on the group participation information, whether the first UE is to participate in a group; and
if the first UE is determined to participate in the group, allocating, to the first UE, a specific resource region identical to a resource region allocated to one or more second UEs currently participating in the group,
wherein the group participation information includes:
first information indicating whether the first UE is capable of cancelling self-interference at the specific resource region,
second information indicating whether the first UE is capable of measuring and reporting inter-device interference (IDI) for the one or more second UEs at the specific resource region, and
third information indicating whether the first UE requests to be grouped.

2. The method according to claim 1, further comprising: receiving group allocation information indicating whether the first UE is currently participating in the group.

3. The method according to claim 2, further comprising: if the third information indicates that the first UE requests to be grouped and the group allocation information indicates that the first UE is currently participating in the group, measuring interference by allocating respective frequencies different from each other to each of a plurality of groups for a first time.

4. The method according to claim 3, further comprising: if the third information indicates that the first UE requests to be grouped and the group allocation information indicates that the first UE is not currently participating in the group, measuring interference by allocating a common frequency to the one or more second UEs for a second time.

5. The method according to claim 2, further comprising: if the group allocation information indicates that the first UE is currently participating in the group and the third information indicates that the first UE requests to be ungrouped, releasing the first UE from the group.

6. The method according to claim 2, further comprising: if the third information indicates that the first UE requests to be grouped and the group allocation information indicates that the first UE is currently participating in the group, determining whether the first UE is to be released from the group and is to participate in a second group.

7. The method according to claim 1, wherein the group participation information further includes fourth information indicating whether the first UE is operated in a full duplex (FD) mode or whether the first UE supports the one or more second UEs, if the first UE is capable of cancelling the self-interference at the specific resource region and if the first UE is capable of measuring and reporting IDI for the one or more second UEs at the specific resource region.

8. An e-Node B (eNB) for allocating resources in a wireless access system supporting full duplex radio (FDR), the eNB comprising:
radio frequency (RF) units; and
a processor,
wherein the processor is configured to:
receive, from a first user equipment (UE), group participation information,
determine whether the first UE is to participate in a group based on the group participation information, and
if the first UE is determined to participate in the group, allocate, to the first UE, a specific resource region identical to a resource region allocated to one or more second UEs currently participating in the group, and
wherein the group participation information includes:
first information indicating whether the first UE is capable of cancelling self-interference at the specific resource region,
second information indicating whether the first UE is capable of measuring and reporting inter-device interference (IDI) for the one or more second UEs at the specific resource region, and
third information indicating whether the first UE requests to be grouped.

9. The eNB according to claim 8, wherein the processor is further configured to:
receive group allocation information indicating whether the first UE is currently participating in the group.

10. The eNB according to claim 9, wherein, if the third information indicates at the first UE requests to be grouped and the group allocation information indicates that the first UE is currently participating in the group, the processor is further configured to measure interference by allocating respective frequencies different from each other to each of a plurality of groups for a first time.

11. The eNB according to claim 10, wherein, if the third information indicates that the first UE requests to be grouped and the group allocation information indicates that the first UE is not currently participating in the group, the processor is further configured to measure interference by allocating a common frequency the one or more second UEs for a second time.

12. The eNB according to claim 9, wherein, if the group allocation information indicates that the first UE is currently participating in the group and the third information indicates that the first UE requests to be ungrouped, the processor is further configured to release the first UE from the group.

13. The eNB according to claim 9, wherein, if the third information indicates that the first UE requests to be grouped and the group allocation information indicates that the first UE is currently participating in the group, the processor is further configured to determine whether the first UE is to be released from the group and is to participate in a second group.

14. The eNB according to claim 8, wherein the group participation information further includes fourth information indicating whether the first UE is operated in a full duplex (FD) mode or whether the first UE supports the one or more second UEs, if the first UE is capable of cancelling the self-interference at the specific resource region and if the first UE is capable of measuring and reporting IDI for the one or more second UEs at the specific resource region.

\* \* \* \* \*